(12) United States Patent
Yoshida et al.

(10) Patent No.: US 8,174,349 B2
(45) Date of Patent: May 8, 2012

(54) ELECTRONIC COMPONENT AND MANUFACTURING METHOD OF ELECTRONIC COMPONENT

(75) Inventors: Makoto Yoshida, Tokyo (JP); Hiroshi Kamiyama, Tokyo (JP); Tomonaga Nishikawa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/621,194

(22) Filed: Nov. 18, 2009

(65) Prior Publication Data

US 2010/0157565 A1 Jun. 24, 2010

(30) Foreign Application Priority Data

Dec. 22, 2008 (JP) .................................. 2008-325389
Aug. 31, 2009 (JP) .................................. 2009-199260

(51) Int. Cl.
*H01F 5/00* (2006.01)
*H01F 27/28* (2006.01)
*H01L 21/66* (2006.01)
*H01L 23/12* (2006.01)

(52) U.S. Cl. .......... 336/200; 336/223; 336/232; 438/15; 257/700; 257/701

(58) Field of Classification Search .................. 336/200, 336/223, 232; 438/15, 106, 238, 381, 622; 257/700, 701
See application file for complete search history.

(56) References Cited

U.S. PATENT DOCUMENTS

| | | | |
|---|---|---|---|
| 6,194,248 B1 * | 2/2001 | Amaya et al. ................. 438/110 |
| 6,286,225 B1 * | 9/2001 | Schimmels et al. ............ 33/645 |
| 6,380,619 B2 * | 4/2002 | Ahiko et al. ................... 257/703 |
| 6,392,297 B2 * | 5/2002 | Seto ................................ 257/701 |
| 6,452,473 B1 * | 9/2002 | Suzuki et al. .................. 336/223 |
| 6,525,395 B1 * | 2/2003 | Kawase et al. ................. 257/528 |
| 6,618,929 B2 * | 9/2003 | Kitamura ........................ 29/602.1 |
| 6,696,911 B2 * | 2/2004 | Tomohiro et al. ............. 336/200 |
| 6,700,061 B2 * | 3/2004 | Kishimoto ..................... 174/377 |
| 6,831,528 B2 * | 12/2004 | Nagata et al. .................. 333/101 |
| 7,129,145 B2 * | 10/2006 | Kawamura et al. ........... 438/381 |

(Continued)

FOREIGN PATENT DOCUMENTS

CN A-1172413 2/1998

(Continued)

OTHER PUBLICATIONS

Office Action dated Feb. 21, 2012 issued in Japanese Patent Application No. 2009-261740 (with translation).

*Primary Examiner* — Anh Mai
*Assistant Examiner* — Joselito Baisa
(74) *Attorney, Agent, or Firm* — Oliff & Berridge, PLC

(57) ABSTRACT

A manufacturing method of electronic components includes forming a first insulation layer on a substrate, forming a plurality of passive elements on the first insulation layer, forming a second insulation layer on the passive elements, forming a plurality of conductor layers electrically connected to the respective passive elements, on the outer side of the second insulation layer to be exposed to an upper surface of each electronic component, and forming grooves between the electronic components including the respective passive elements to expose side surfaces of each electronic component and parts of the conductor layers from the side surfaces of each electronic component. The manufacturing method further including plating a plurality of external electrodes on the respective conductor layers exposed to the upper surface and the side surfaces of each electronic component, and cutting the substrate to completely separate into individual electronic components.

12 Claims, 20 Drawing Sheets

U.S. PATENT DOCUMENTS

| | | |
|---|---|---|
| 7,508,292 B2 | 3/2009 | Nishikawa et al. |
| 7,696,849 B2 * | 4/2010 | Ito et al. .................. 336/192 |
| 7,765,661 B2 * | 8/2010 | Motoki et al. .............. 29/25.41 |
| 7,855,460 B2 * | 12/2010 | Kuwajima .................. 257/773 |
| 8,021,965 B1 * | 9/2011 | Bernstein et al. ............. 438/462 |
| 8,050,045 B2 | 11/2011 | Okuzawa et al. |
| 2008/0026136 A1 * | 1/2008 | Skamser et al. ................ 427/79 |
| 2008/0236870 A1 | 10/2008 | Kuwajima et al. |

FOREIGN PATENT DOCUMENTS

| | | |
|---|---|---|
| CN | A-101276693 | 10/2008 |
| EP | 0 798 851 A1 | 1/1997 |
| JP | 06-096992 | 4/1994 |
| JP | A-8-203737 | 8/1996 |
| JP | A-2002-203718 | 7/2002 |
| JP | A-2007-53254 | 3/2007 |
| JP | A-2008-140858 | 6/2008 |

* cited by examiner

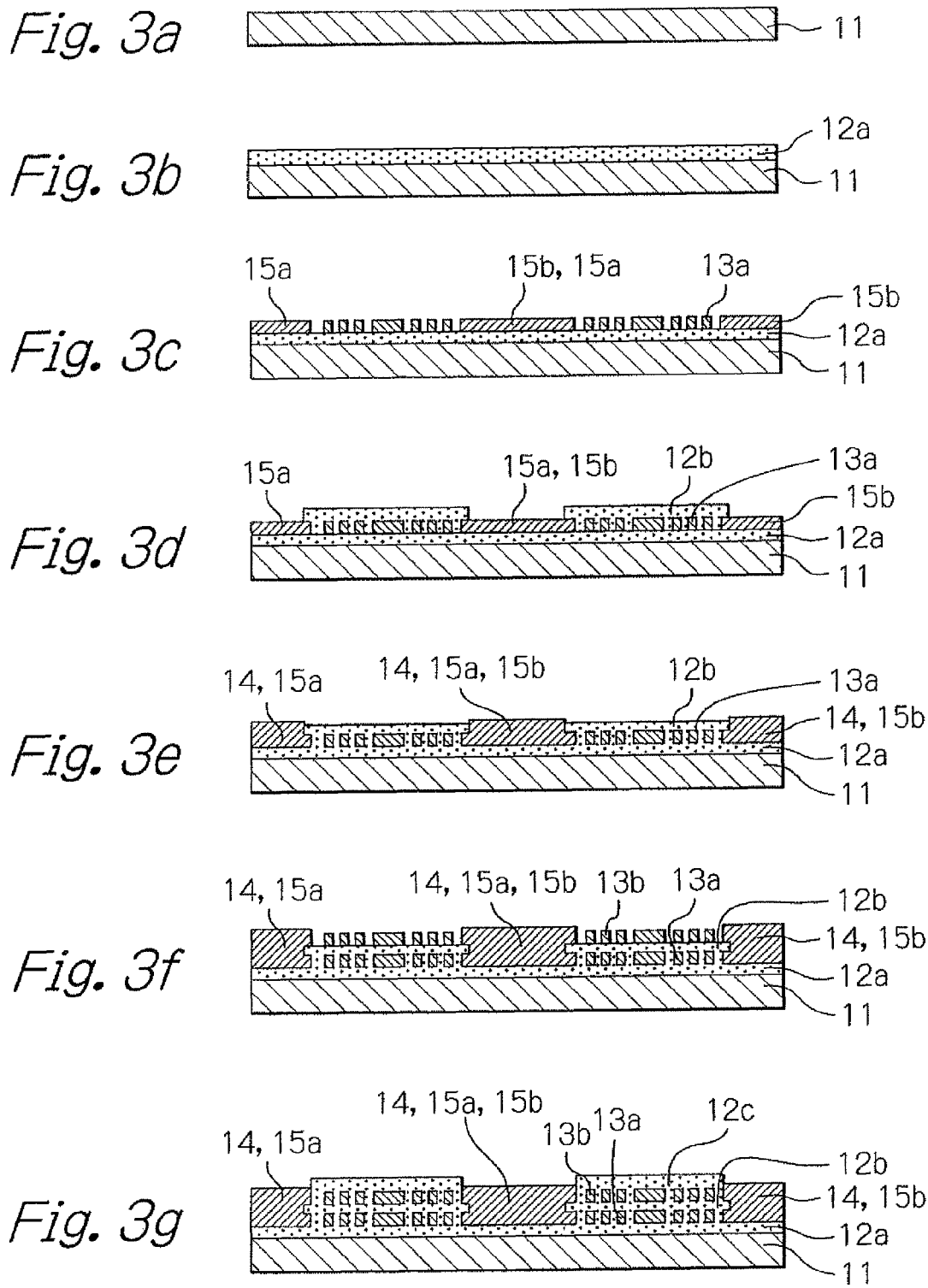

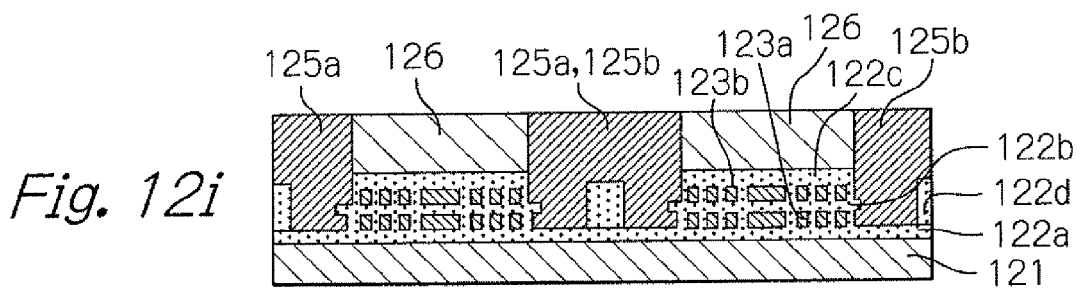
Fig. 12i
Fig. 12j
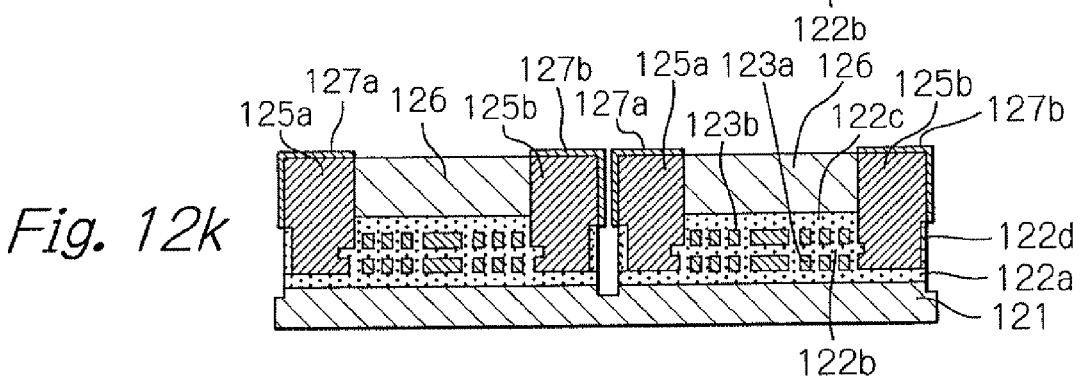
Fig. 12k
Fig. 12l
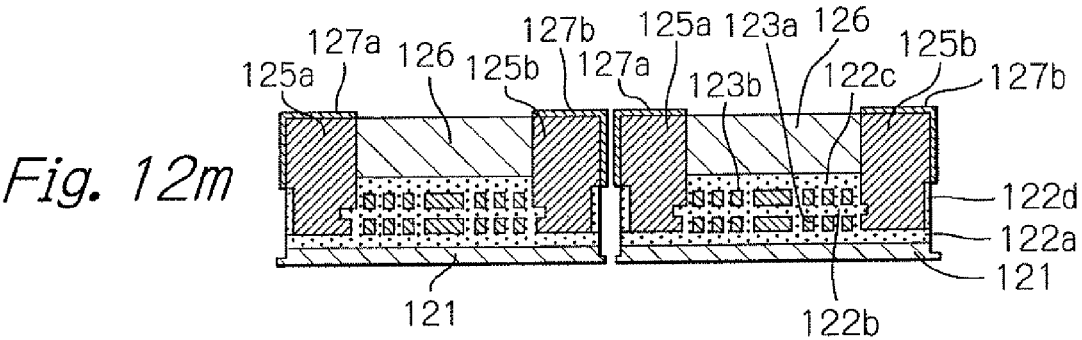
Fig. 12m

ELECTRONIC COMPONENT AND MANUFACTURING METHOD OF ELECTRONIC COMPONENT

PRIORITY CLAIM

This application claims priority from Japanese patent applications No. 2008-325389 filed on Dec. 22, 2008 and No. 2009-199260 filed on Aug. 31, 2009, which are incorporated herein by reference.

BACKGROUND OF THE INVENTION

1. Field of the Invention

The present invention relates to a surface-mounted type electronic component for surface-mounting on a printed circuit board or on a hybrid integrated circuit (HIC), which are used for an electronic equipment, and a manufacturing method of the electronic component.

2. Description of the Related Art

There are various passive components such as coil components configuring inductor elements or common mode choke coils or capacitor components, used as electronic components surface-mounted on electronic equipments such as computers or mobile telephones.

As for the coil component for example, known are a line-wound type coil component with a ferrite core and a copper wire wound around the ferrite core, a laminated type coil component with laminated magnetic sheets made of such as a ferrite and a coil conductor pattern formed on a surface of each sheet, and a thin-film type coil component with insulation films and thin metal coil conductors alternately laminated on each other using thin-film fabrication technology.

Japanese patent publication Nos. 8-203,737 and 2002-203,718 disclose a common mode choke coil that is an example of the thin-film type coil component. This common mode choke coil is formed in general by laminating alternately insulation layers and coil layers on a ferrite substrate using a thin-film fabrication technology, by laminating a ferrite substrate thereon, by cutting the laminated layers and substrates to separate into individual chips each having a rectangular parallelepiped external shape, and then by plating external electrodes so that they are connected to internal electrode terminals exposed on side surfaces of the chip.

The conventional electronic components such as the above-mentioned common mode choke coils are fabricated as follows. First, a lot of elements are formed on a substrate using a thin-film fabrication technology, then the substrate is cut to separate into individual element chips, and thereafter external electrodes are formed by plating on a top surface, side surfaces and a bottom surface of each chip. In order to obtain enough strength in soldering joint with a printed circuit board and enough conductivity with inner conductors, the common mode choke coil described in Japanese patent publication No. 8-203,737 has a U-shaped cross-section pattern in each external electrode.

However, because no side surface of the chip will expose before cutting the substrate into the individual chips, it is impossible to make the external electrodes on the side surfaces before the cutting process. If no external electrode is formed on the side surfaces, an area of the electrodes becomes extremely small and thus enough strength cannot be ensured in soldering joint.

Therefore, when fabricating such electronic components, external electrode pattern with a desired cross-section shape is formed on surfaces of each chip after cutting the substrate into the individual chips. Since it is necessary to form the external electrode pattern after having separated into individual chips, according to the conventional art, it is very difficult to precisely form the shape, dimensions and position of each external electrode. In addition, according to the conventional art, because a plurality of fabrication processes such as a process for fabricating elements on a substrate and a process performed after the separation of the substrate into individual chips are necessary, the manufacturing cost will be extremely increased.

SUMMARY OF THE INVENTION

It is therefore an object of the present invention to provide an electronic component having external electrodes with a large electrode area so that enough soldering strength is available when mounting the electronic component, and to provide a manufacturing method of the electronic component.

Another object of the present invention is to provide an electronic component having external electrodes with precise shape, dimensions and position, and to provide a manufacturing method of the electronic component.

Further object of the present invention is to provide an electronic component and a manufacturing method of the electronic component, whereby miniaturization and lower manufacturing cost of the electronic component can be attained.

According to the present invention, an electronic component includes at least one passive element found in the electronic component, an insulation layer for covering the at least one passive element, a plurality of conductor layers electrically connected to the at least one passive element and formed on the outer side of the insulation layer to extend to at least a part of an upper surface of the electronic component, and a plurality of external electrodes, each having a L-shaped section, formed to coat the plurality of conductor layers at the part of the upper surface of the electronic component and formed on a part of at least one side surface of the electronic component.

Each of external electrodes is formed to coat each conductor layer at the part of the upper surface of the passive element and formed on the part of the side surface of the passive element to have a L-shaped section. Since each external electrode is formed on not only the upper surface but also the side surface of the electronic component to have a L-shaped section, a large area of the external electrode can be obtained to provide enough strength in soldering joint for mounting.

It is preferred that each of the plurality of external electrodes has the L-shaped section only between the upper surface and a one side surface of the electronic component, or each of the plurality of external electrodes has the L-shaped section between the upper surface and each of two side surfaces of the electronic component and between the two side surfaces of the electronic component.

It is also preferred that the plurality of conductor layers are extended to the part of the upper surface of the electronic component and to the parts of the side surfaces of the electronic component, and that the plurality of external electrodes are coated on the plurality of conductor layers at the part of the upper surface of the electronic component and on part of the at least one side surface of the electronic component.

It is further preferred that each of the plurality of external electrodes consists of a conductor film plated on each of the plurality of conductor layers. In this case, preferably, each of the conductor films is composed of a multi-layered film including a gold (Au) film or of a tin (Sn) film.

It is still further preferred that the plurality of conductor layers are extended only to the part of the upper surface of the electronic component, and that the plurality of external electrodes are electrically conducted to the plurality of conductor layers only at the part of the upper surface of the electronic component.

It is further preferred that each of the plurality of external electrodes consists of a lower conductor film formed on each of the plurality of conductor layers at the part of the upper surface of the electronic component and formed on the part of the at least one side surface of the electronic component, and an upper conductor film plated on the lower conductor film. In this case, preferably, the lower conductor film is composed of a multi-layered film including a cupper (Cu) film. Also, the upper conductor film is composed of a multi-layered film including an Au film or of a Sn film.

It is further preferred that the at least one passive element includes at least one of an inductor, a capacitor and a resister. In this case, preferably, the electronic component includes a common mode choke coil with the inductor, another insulation layer containing a magnetic material, and a magnetic substrate on which the inductor is mounted.

According to the present invention, also a manufacturing method of electronic components includes a step of forming a first insulation layer on a substrate, a step of forming a plurality of passive elements on the first insulation layer, a step of forming a second insulation layer on the passive elements, a step of forming a plurality of conductor layers electrically connected to the respective passive elements, on the outer side of the second insulation layer to be exposed to an upper surface of each electronic component, a step of forming grooves between the electronic components including the respective passive elements to expose side surfaces of each electronic component and parts of the conductor layers from the side surfaces of each electronic component, a step of plating a plurality of external electrodes on the respective conductor layers exposed to the upper surface and the side surfaces of each electronic component, and a step of cutting the substrate to completely separate into individual electronic components.

Forming of grooves on the substrate is performed so that the side surfaces of each electronic component are exposed before separating it into individual electronic components, then the external electrodes are plated on the respective conductor layers exposed on the side surfaces and upper surface, and thereafter the substrate is completely cut to separate into individual electronic components. Since the external electrodes are formed before separating the substrate into individual electronic components, it is possible to precisely form the shape, dimensions and position of each external electrode and to more miniaturize the electronic component. Also, since the manufacturing process is not separated into a process for fabricating elements on a substrate and a process performed after the separation of the substrate into individual electronic components, the manufacturing cost will not be increased. Further, because each external electrode has a L-shaped section formed by partially coating not only the upper surface of the electronic component but also the side surface of the electronic component, a large area of the electrode can be obtained to provide enough strength in soldering joint for mounting.

According to the present invention, further, a manufacturing method of electronic components includes a step of forming a first insulation layer on a substrate, a step of forming a plurality of passive elements on the first insulation layer, a step of forming a second insulation layer on the passive elements, a step of forming a plurality of conductor layers electrically connected to the respective passive elements, on the outer side of the second insulation layer to be exposed to an upper surface of each electronic component, a step of cutting the substrate to completely separate into individual electronic components so as to expose side surfaces of each electronic component and parts of the conductor layers from the side surfaces of each electronic component, and a step of plating a plurality of external electrodes on the respective conductor layers exposed to the upper surface and the side surfaces of each separated individual electronic component.

Electronic components formed on the substrate are separated into individual electronic components so that side surfaces of each electronic component are exposed. Thus, the external electrodes are plated on the respective conductor layers exposed on the side surfaces and the upper surface. Since the external electrodes are thus plated on the exposed conductor layers, it is possible to precisely form the shape, dimensions and position of each external electrode and to more miniaturize the electronic component. Also, because each external electrode is formed on not only the upper surface of the electronic component but also the side surface of the electronic component, a large area of the electrode can be obtained to provide enough strength in soldering joint for mounting.

It is preferred that the manufacturing method further includes a step of chamfering each electronic component after the separation into the individual electronic components.

It is also preferred that the step of plating a plurality of external electrodes includes a step of forming the external electrodes by plating a multi-layered film including an Au film or of a Sn film.

It is further preferred that the step of forming a plurality of passive elements includes a step of forming at least one of an inductor, a capacitor and a resister. In this case, preferably, the electronic component includes a common mode choke coil, the substrate includes a magnetic substrate, and the manufacturing method further includes a step of filling a magnetic-material contained layer between the conductive layers before cutting the substrate.

According to the present invention, still further, a manufacturing method of electronic components includes a step of forming a first insulation layer on a substrate, a step of forming a plurality of passive elements on the first insulation layer, a step of forming a second insulation layer on the passive elements, a step of forming a plurality of conductor layers electrically connected to the respective passive elements, on the outer side of the second insulation layer to be exposed to an upper surface of each electronic component, a step of forming a third insulation layer on the outer side of the conductor layers, a step of forming shallow grooves to expose side surfaces of each electronic component including the passive element and parts of the third insulation layer from the side surfaces of each electronic component, a step of sputtering a lower conductor film for external electrodes on the conductor layers exposed to the upper surface of each electronic component and on the parts of the third insulation layer exposed to the side surfaces of each electronic component, a step of plating an upper conductor film for external electrodes on the lower conductor film for external electrodes, and a step of cutting the substrate to completely separate into individual electronic components.

According to the present invention, further, a manufacturing method of electronic components includes a step of forming a first insulation layer on a substrate, a step of forming a plurality of passive elements on the first insulation layer, a step of forming a second insulation layer on the passive elements, a step of forming a plurality of conductor layers electrically connected to the respective passive elements, on the outer side of the second insulation layer to be exposed to an upper surface of each electronic component, a step of forming a third insulation layer on the outer side of the conductor layers, a step of forming shallow grooves to expose side surfaces of each electronic component including the passive element and parts of the third insulation layer from the side surfaces of each electronic component, a step of sputtering a lower conductor film for external electrodes on the conductor layers exposed to the upper surface of each electronic component and on the parts of the third insulation layer exposed to the side surfaces of each electronic component, a step of cutting the substrate to completely separate into individual electronic components, and a step of plating an upper conductor film for external electrodes on the lower conductor film for external electrodes of each separated individual electronic component.

Forming of shallow grooves on the substrate is performed so that the side surfaces of each electronic component are exposed before separating it into individual electronic components, then the lower conductor films are sputtered on the respective conductor layers exposed on the side surfaces and upper surface, and thereafter the substrate is completely cut to separate into individual electronic components. Since the lower conductor films for external electrodes are formed before separating the substrate into individual electronic components, it is possible to precisely form the shape, dimensions and position of each external electrode and to more miniaturize the electronic component. Further, because each external electrode is formed on not only the upper surface of the electronic component but also the side surface of the electronic component, a large area of the electrode can be obtained to provide enough strength in soldering joint for mounting.

It is preferred that the step of sputtering a lower conductor film for external electrodes includes a step of forming a lower conductor film for external electrodes by sputtering a multi-layered film including a Cu film.

It is also preferred that the step of plating an upper conductor film for external electrodes includes a step of forming an upper conductor film for external electrodes by plating a multi-layered film including an Au film or of a Sn film.

It is further preferred that the step of forming a plurality of passive elements includes a step of forming at least one of an inductor, a capacitor and a resister. In this case, preferably, the electronic component includes a common mode choke coil, the substrate includes a magnetic substrate, and the manufacturing method further includes a step of filling a magnetic-material contained layer between the conductive layers before cutting the substrate.

Further objects and advantages of the present invention will be apparent from the following description of the preferred embodiments of the invention as illustrated in the accompanying drawings.

BRIEF DESCRIPTION OF THE DRAWINGS

FIGS. 3a to 3m show sectional views schematically illustrating manufacturing processes of the common mode choke coil of the embodiment shown in FIGS. 1a, 1b and 1c;

FIGS. 12a to 12m show sectional views schematically illustrating manufacturing processes of a common mode choke coil as further embodiment of an electronic component according to the present invention.

DESCRIPTION OF THE PREFERRED EMBODIMENTS

Figure 1A:
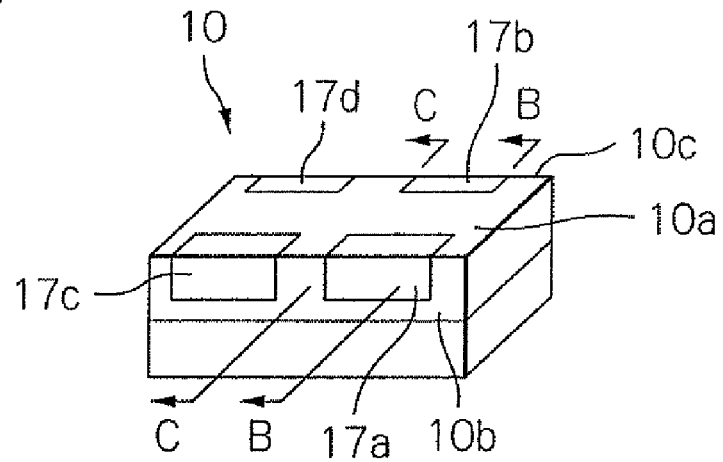
FIGS. 1a, 1b and 1c show an external perspective view, a B-B line sectional view and a C-C line sectional view schematically illustrating configuration of a common mode choke coil as an embodiment of an electronic component according to the present invention.
Figure 1B:
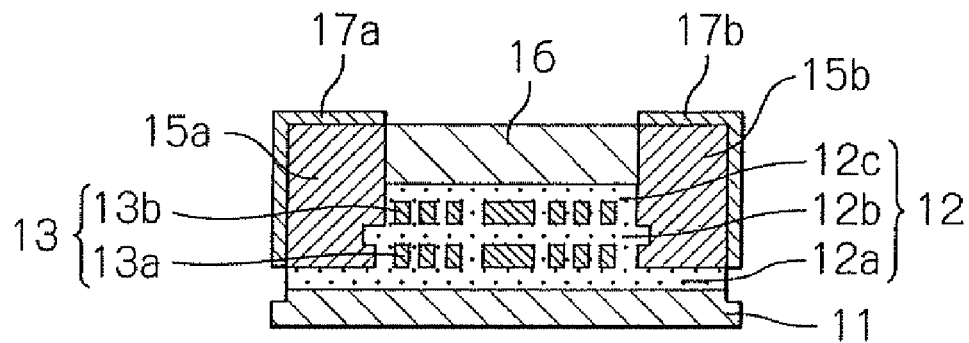
Figure 1C:
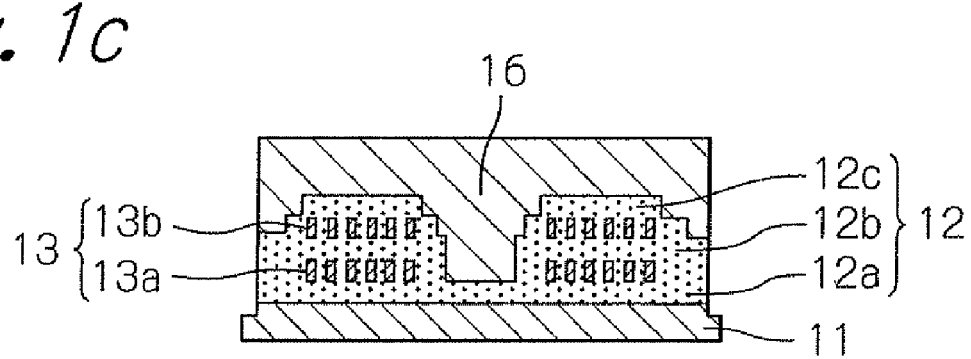
Figure 2:
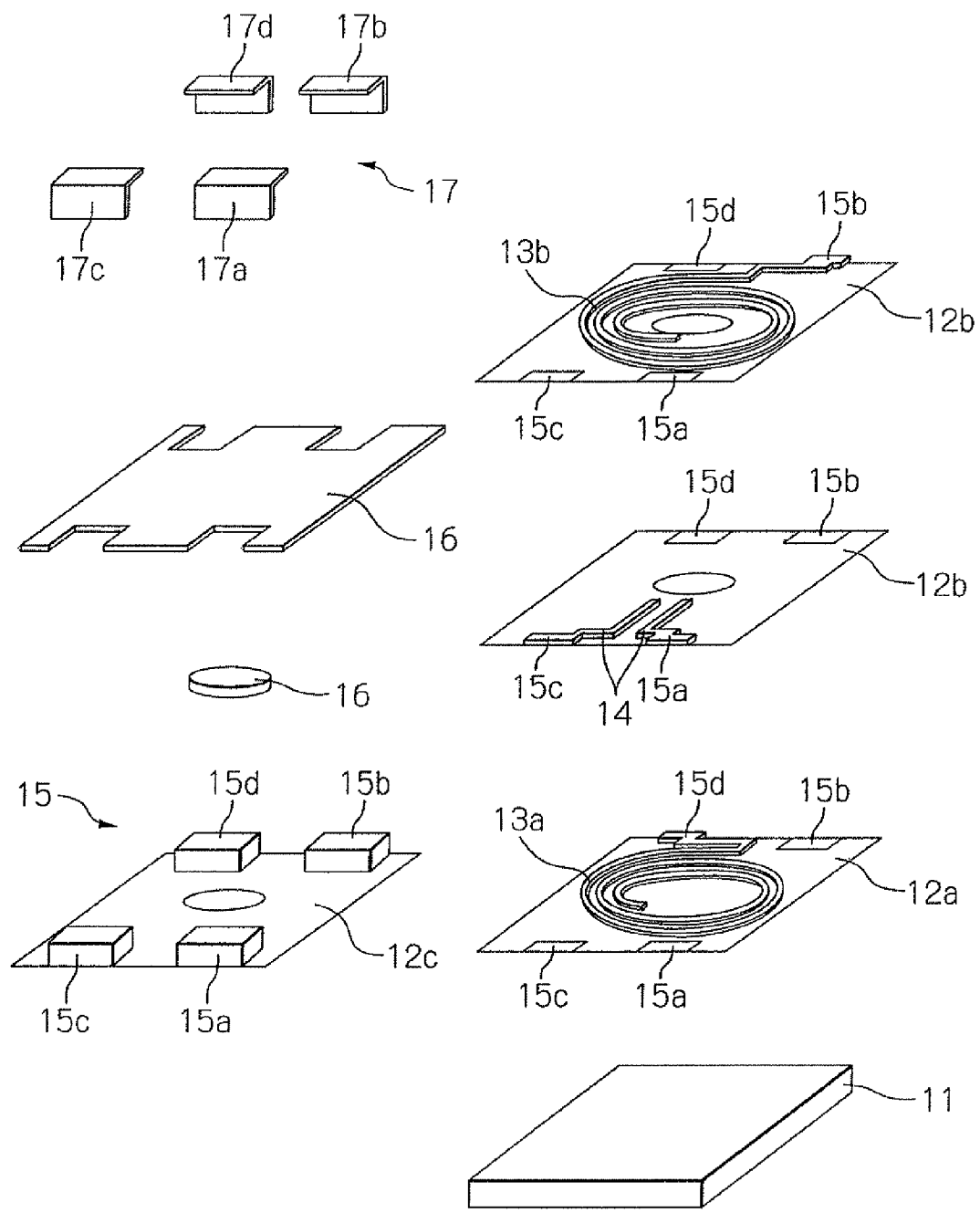
FIG. 2 shows an exploded perspective view illustrating configuration of the common mode choke coil of the embodiment shown in FIGS. 1a, 1b and 1c.

FIGS. 1a, 1b and 1c schematically illustrate configuration of a common mode choke coil as an embodiment of an electronic component according to the present invention, and FIG. 2 illustrates an exploded configuration of the common mode choke coil of this embodiment. FIG. 1a shows an external perspective view, FIG. 1b shows a B-B line section and FIG. 1c shows a C-C line section. It should be noted that the B-B line section of FIG. 1b corresponds to a section where external electrodes are existed and that the C-C line section of FIG. 1c corresponds to a section where no external electrode is existed.

In these figures, reference numeral 10 denotes a common mode choke coil, 11 denotes a ferrite substrate, 12 denotes an insulation layer laminated on the ferrite substrate 11 and configured by a first insulation film 12a, a second insulation film 12b and a third insulation film 12c, 13 denotes a coil conductor layer surrounded by the insulation layer 12 and configured by a first coil conductor film 13a and a second coil conductor film 13b, 14 denotes a lead conductor layer one end of which is electrically connected to the coil conductor layer 13 via a via hole conductor (not shown) and the other end is electrically connected to an inner electrode (15), 15 denotes the inner electrode come to a part of an upper surface 10a and parts of side surfaces 10b and 10c of the common mode choke coil 10, and configured by first to fourth inner electrode layers 15a to 15d, 16 denotes a ferrite-resin compound layer laminated on the insulation layer 12 and containing a ferrite material, and 17 denotes external electrodes configured by first to fourth external electrode films 17a to 17d respectively coated on outer surfaces of the first to fourth inner electrode layers 15a to 15d, respectively. In this embodiment, each of the first to fourth external electrode films 17a to 17d of the external electrodes 17 has a L-shaped section formed by partially coating the upper surface 10a and the side surface 10b or 10c. It should be noted that, in FIG. 2, the coil conductor 13 is simplified in about three-turns.

As is well known, a common mode choke coil is an electronic component used for suppressing a common mode current causing electromagnetic interference in a balanced transmission system. The common mode choke coil in this embodiment is a surface mounting component having a substantially rectangular parallelepiped outer shape and four external electrodes formed on its upper surface and side surfaces. The size of its bottom is approximately 0.6 mm×0.3 mm, and its height is approximately 0.3 mm. In modifications, chamfering processing may be performed for each corner and for each edge between adjacent surfaces of the common mode choke coil.

In this embodiment, the ferrite substrate 11 is formed of a sintered ferrite body such as a Ni—Zn (nickel-zinc) ferrite, the insulation layer 12 is made of a thermally cured polyimide resin, the coil conductor 13, the lead conductor layer 14 and the inner electrode 15 are made of a conductive material such as Cu, Au, aluminum (Al) or silver (Ag), and the ferrite-resin compound layer 16 is made of an epoxy resin material containing ferrite particles. Also, in this embodiment, each external electrode 17 is formed from a single layer of conductive material such as Sn, or from a multilayer of conductive materials of a Ni film and an Au film laminated on the Ni film for corrosion-inhibiting even if it is exposed to ambient air for a long time.

FIGS. 3a to 3m and FIGS. 4a to 4m schematically illustrate manufacturing processes of the common mode choke coil of this embodiment. Note that FIGS. 3a to 3m correspond to FIG. 1b that is a section where the external electrodes are existed and that FIGS. 4a to 4m correspond to FIG. 1c that is a section where no external electrode is existed. Hereinafter, using these figures, the manufacturing process of the common mode choke coil in this embodiment will be described.

Figure 3H:
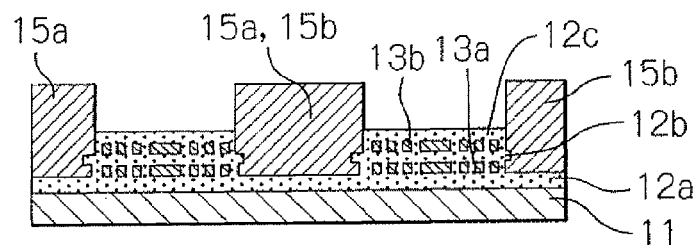
Figure 4A:
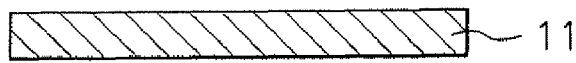
FIGS. 4a to 4m show sectional views schematically illustrating manufacturing processes of the common mode choke coil of the embodiment shown in FIGS. 1a, 1b and 1c.

As shown in FIGS. 3a and 4a, first, a ferrite substrate 11 with a thickness of about 0.1 to 2.0 mm is formed by sintering a ferrite material such as Ni—Zn ferrite, by cutting the sintered ferrite body, by machining the cut ferrite body and by lapping the machined ferrite body.

Figure 4B:
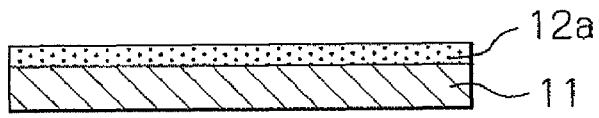

Then, as shown in FIGS. 3b and 4b, a first insulation film 12a with a thickness of about 1.0 to 10 µm is formed on the whole surface of the substrate 11 by spin-coating a polyimide resin material over the whole surface of the substrate and by thermally curing the coated polyimide.

Figure 4C:
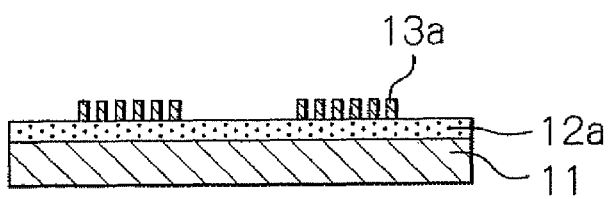

Next, as shown in FIGS. 3c and 4c, a plating seed film (not shown) is formed on the first insulation film 12a by sputtering, and a resist pattern (not shown) is formed thereon. Then, the first coil conductor film 13a and a part of the first to fourth inner electrode layers 15a to 15d, having a thickness of about 5.0 to 20 µm, are formed by performing electrolyte plating or electroless plating of a conductive material such as Cu, Au, Al or Ag, and thereafter the resist pattern and the plating seed film under it are removed.

Figure 4D:
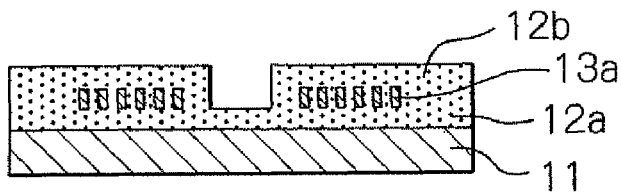

Then, as shown in FIGS. 3d and 4d, the second insulation film 12b with a thickness of about 3.0 to 20 µm is formed thereon by spin-coating a polyimide resin material thereon, by patterning the coated polyimide resin itself and by thermally curing the polyimide resin pattern.

Figure 4E:
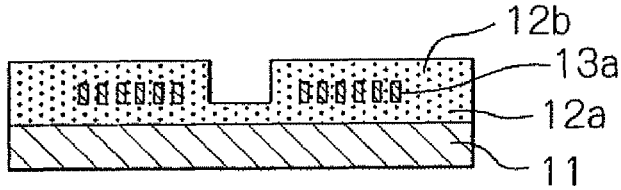

Next, as shown in FIGS. 3e and 4e, a plating seed film (not shown) is formed by sputtering, and a resist pattern (not shown) is formed thereon. Then, the lead conductor layer 14 and a part of the first to fourth inner electrode layers 15a to 15d, having a thickness of about 5.0 to 20 µm, are formed by performing electrolyte plating or electroless plating of a conductive material such as Cu, Au, Al or Ag, and thereafter the resist pattern and the plating seed film under it are removed.

Figure 4F:
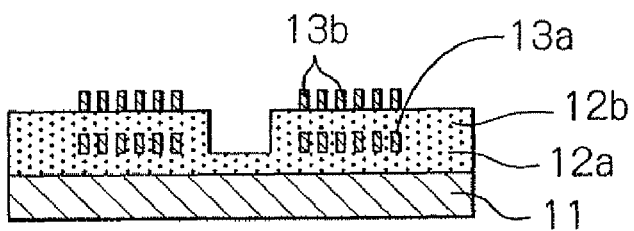

Then, as shown in FIGS. 3f and 4f, a plating seed film (not shown) is formed on the second insulation film 12b by sputtering, and a resist pattern (not shown) is formed thereon. Then, the second coil conductor film 13b, having a thickness of about 5.0 to 20 µm, is formed by performing electrolyte plating or electroless plating of a conductive material such as Cu, Au, Al or Ag, and thereafter the resist pattern and the plating seed film under it are removed. It should be noted that the lead conductor layer 14 is extended to the center region of the common mode choke coil 10 and that there is the second insulation film 12b between the lead conductor layer 14 and the second coil conductor film 13b intersected with this lead conductor layer 14, as shown in FIG. 2.

Figure 4G:
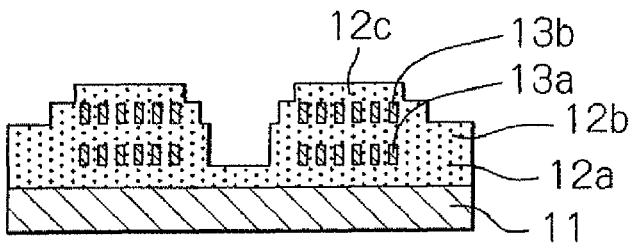

Next, as shown in FIGS. 3g and 4g, the third insulation film 12c with a thickness of about 3.0 to 20 µm is formed thereon by spin-coating a polyimide resin material thereon, by patterning the coated polyimide resin itself and by thermally curing the polyimide resin pattern.

Figure 4H:
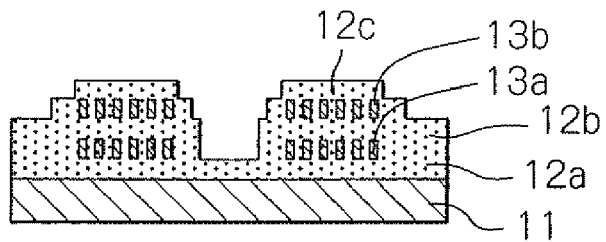

Then, as shown in FIGS. 3h and 4h, a resist pattern (not shown) is formed on the third insulation film 12c, the inner electrode 15 constituted by the first to fourth inner electrode layers 15a to 15d, having a thickness of about 5.0 to 200 µm, is additionally formed by performing electrolyte plating or electroless plating of a conductive material such as Cu, Au, Al or Ag, and thereafter the resist pattern is removed.

Figure 3I:
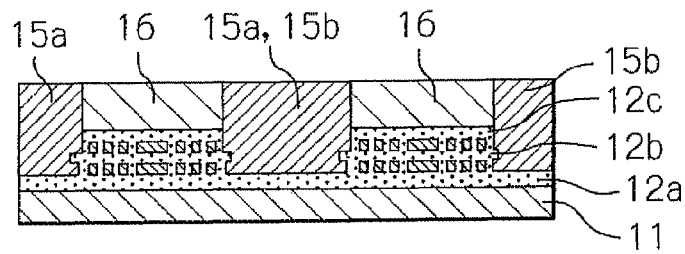
Figure 4I:
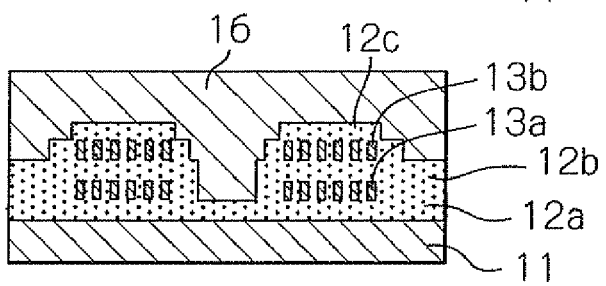

Thereafter, as shown in FIGS. 3i and 4i, the ferrite-resin compound layer 16 with a thickness of about 5.0 to 200 µm is formed thereon by coating an epoxy resin material containing ferrite particles, by thermally curing the epoxy resin, and by polishing the surface of the cured ferrite-resin compound.

Figure 3J:
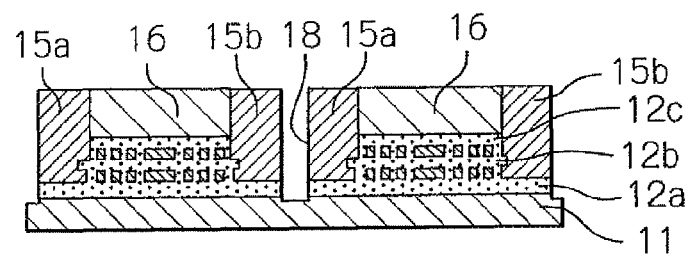
Figure 4J:
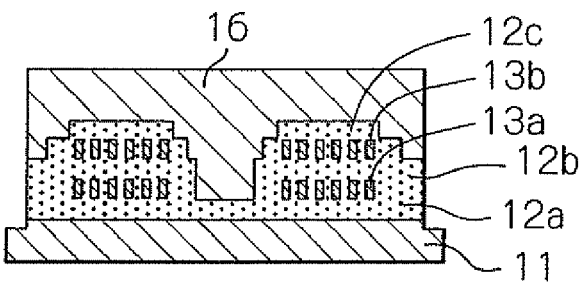

Then, as shown in FIGS. 3j and 4j, shallow grooves 18 are formed on the substrate 11 using a rotational cutting tool for grooving. Each shallow groove 18 is formed between the common mode choke coils coupled to each other to have a width of for example about 70 µm without completely separating the substrate 11 into the individual common mode choke coils. By forming the shallow groove 18 on the substrate 11, the side surfaces 10b and 10c of each common mode choke coil 10 is exposed. Particularly, forming the shallow groove 18 at the position of the inner electrode 15 configured by the first to fourth inner electrode layers 15a to 15d, as this embodiment, a part of these first to fourth inner electrode layers 15a to 15d is exposed to the side surfaces 10b and 10c. Another part of these first to fourth inner electrode layers 15a to 15d is also exposed to the upper surface 10a of the common mode choke coil 10.

Figure 3K:
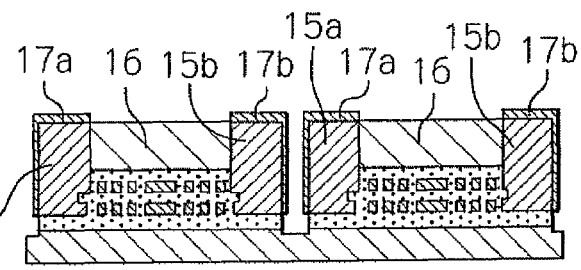
Figure 4K:
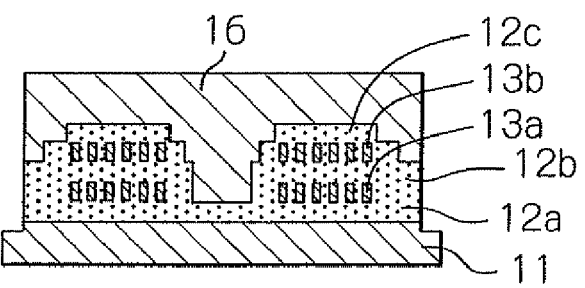

Next, as shown in FIGS. 3k and 4k, a multilayer of Ni/Au (Ni is lower layer and Au is upper layer) is formed by sequentially performing electrolyte plating or electroless plating of Ni and Au in this order, or a single layer of Sn is formed by performing electrolyte plating or electroless plating of Sn, to coat the first to fourth inner electrode layers 15a to 15d exposed on the upper surface 10a and the side surfaces 10b and 10c of the common mode choke coil 10. Thus, the external electrodes 17 configured by the first to fourth external electrode films 17a to 17d, each having a L-shaped section and a thickness of about 1.0 to 10 µm are formed. In a desired example, the external electrodes may be formed from a multilayer of Ni film with a thickness of 3 µm and Au film laminated thereon with a thickness of 0.1 µm.

Figure 3L:
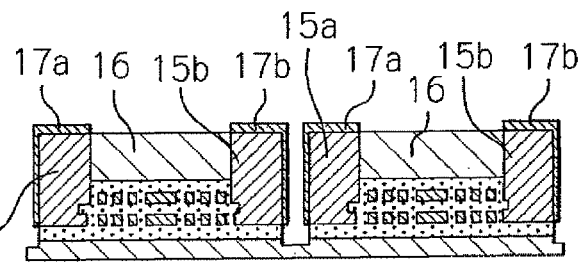
Figure 4L:
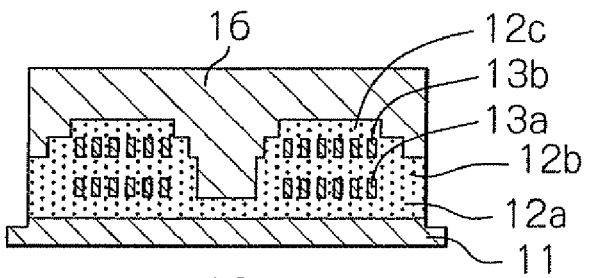

Then, as shown in FIGS. 3l and 4l, the rear surface of the substrate 11 is ground to reduce its thickness. For example, in case that the thickness of the substrate 11 before grinding is 1.5 mm, the rear surface of the substrate 11 is ground to have the thickness of about 0.2 to 0.8 mm.

Figure 3M:
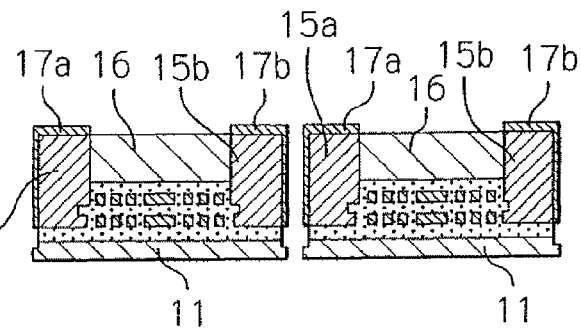
Figure 4M:
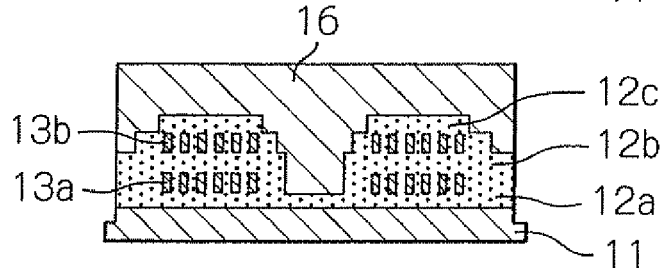

Thereafter, as shown in FIGS. 3m and 4m, the substrate 11 is completely cut to separate into individual common mode choke coils using a rotational cutting tool for cutting.

As described in detail, according to this embodiment, forming of shallow grooves on the substrate 11 is performed so that side surfaces of each common mode choke coil are exposed before separating it into individual common mode choke coils, then the first to fourth external electrode films 17a to 17d are plated on the respective first to fourth inner electrode layers 15a to 15d exposed on the side surfaces and upper surface, and thereafter the substrate 11 is completely cut to separate into individual common mode choke coils. Since the external electrodes are thus formed before separating the substrate into individual common mode choke coils, it is possible to precisely form the shape, dimensions and position of each external electrode and to more miniaturize the common mode choke coil. Also, since the manufacturing process is not separated into a process for fabricating elements on a substrate and a process performed after the separation of the substrate into individual common mode choke coil chips, the manufacturing cost will not be increased. Further, because each external electrode has a L-shaped section formed by partially coating not only the upper surface of the common mode choke coil but also the side surface of the common mode choke coil, a large area of the electrode can be obtained to provide enough strength in soldering joint for mounting on a printed circuit board. Still further, since the common mode choke coil of this embodiment does not have two ferrite substrates superimposed to face each other as the conventional common mode choke coil, it is possible to have a lower height.

Figure 5:
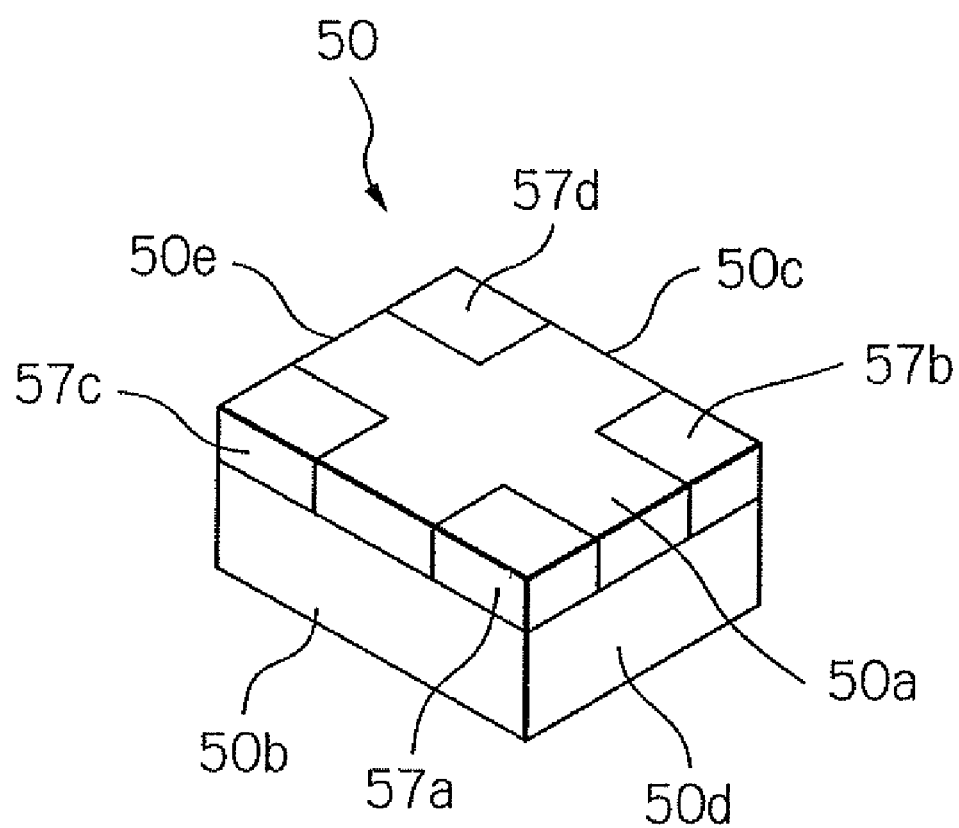
FIG. 5 shows an external perspective view schematically illustrating configuration of a common mode choke coil as a modification of the embodiment shown in FIGS. 1a, 1b and 1c.

FIG. 5 schematically illustrates configuration of a common mode choke coil as a modification of the embodiment shown in FIGS. 1a, 1b and 1c.

In this modification, each of first to fourth external electrode films 57a to 57d that configure external electrodes is formed to partially coat not only an upper surface 50a but also two of side surfaces 50b to 50e to have a L-shaped section between the upper surface and each of the two side surfaces and also to have a L-shaped section between the two side surfaces.

Since each of the first to fourth external electrode films 57a to 57d is formed to have a L-shaped section between two of the three surfaces of the common mode choke coil, a larger electrode area and a higher electrode strength can be obtained to provide more enough strength in soldering joint for mounting on a printed circuit board.

Other configurations, functions and advantages of the modification shown in FIG. 5 are the same as those in the embodiment shown in FIGS. 1a, 1b and 1c.

FIGS. 6a to 6l schematically illustrate manufacturing processes of a common mode choke coil as another embodiment of an electronic component according to the present invention. Hereinafter, using these figures, the manufacturing process of the common mode choke coil in this embodiment will be described. FIGS. 6a to 6l only show two neighboring common mode choke coils. In the description of this embodiment, components similar to these in the embodiment shown in FIGS. 1a, 1b and 1c are indicated by using the same reference numerals.

Figure 6A:
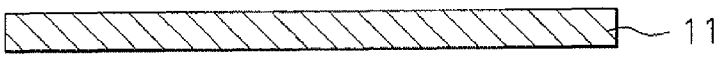
FIGS. 6a to 6l show sectional views schematically illustrating manufacturing processes of a common mode choke coil as another embodiment of an electronic component according to the present invention.

As shown in FIG. 6a, first, a ferrite substrate 11 with a thickness of about 0.1 to 2.0 mm is formed by sintering a ferrite material such as Ni—Zn ferrite, by cutting the sintered ferrite body, by machining the cut ferrite body and by lapping the machined ferrite body.

Figure 6B:
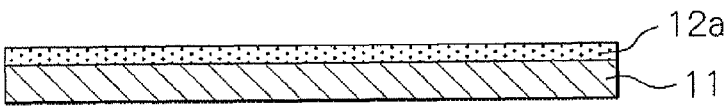

Then, as shown in FIG. 6b, a first insulation film 12a with a thickness of about 1.0 to 10 μm is formed on the whole surface of the substrate 11 by spin-coating a polyimide resin material over the whole surface of the substrate and by thermally curing the coated polyimide.

Figure 6C:
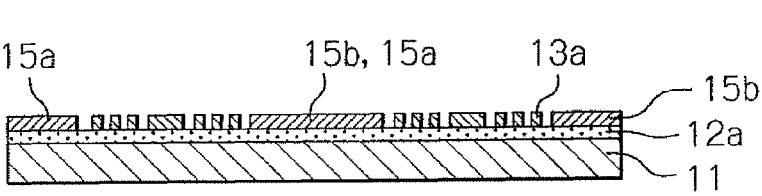

Next, as shown in FIG. 6c, a plating seed film (not shown) is formed on the first insulation film 12a by sputtering, and a resist pattern (not shown) is formed thereon. Then, a first coil conductor film 13a and a part of first to fourth inner electrode layers 15a to 15d, having a thickness of about 5.0 to 20 μm, are formed by performing electrolyte plating or electroless plating of a conductive material such as Cu, Au, Al or Ag, and thereafter the resist pattern and the plating seed film under it are removed.

Figure 6D:
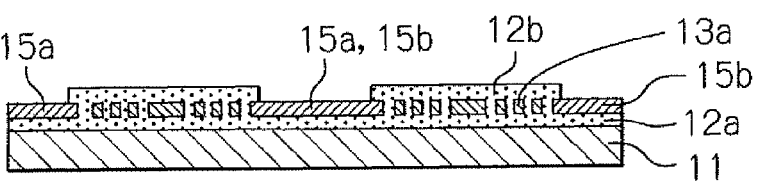

Then, as shown in FIG. 6d, a second insulation film 12b with a thickness of about 3.0 to 20 μm is formed thereon by spin-coating a polyimide resin material thereon, by patterning the coated polyimide resin itself and by thermally curing the polyimide resin pattern.

Figure 6E:
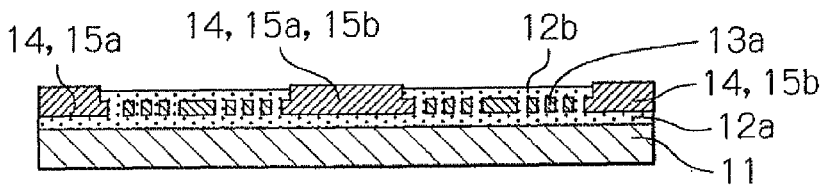

Next, as shown in FIG. 6e, a plating seed film (not shown) is formed by sputtering, and a resist pattern (not shown) is formed thereon. Then, a lead conductor layer 14 and a part of the first to fourth inner electrode layers 15a to 15d, having a thickness of about 5.0 to 20 μm, are formed by performing electrolyte plating or electroless plating of a conductive material such as Cu, Au, Al or Ag, and thereafter the resist pattern and the plating seed film under it are removed.

Figure 6F:
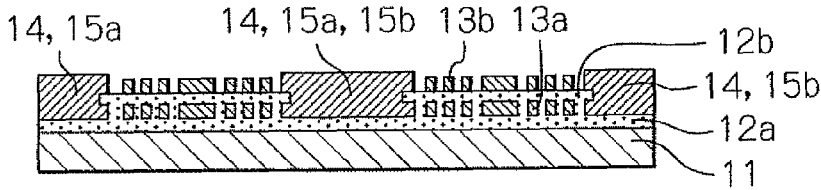

Then, as shown in FIG. 6f, a plating seed film (not shown) is formed on the second insulation film 12b by sputtering, and a resist pattern (not shown) is formed thereon. Then, a second coil conductor film 13b, having a thickness of about 5.0 to 20 μm, is formed by performing electrolyte plating or electroless plating of a conductive material such as Cu, Au, Al or Ag, and thereafter the resist pattern and the plating seed film under it are removed. It should be noted that the lead conductor layer 14 is extended to the center region of the common mode choke coil 10 and that there is the second insulation film 12b between the lead conductor layer 14 and the second coil conductor film 13b intersected with this lead conductor layer 14, as shown in FIG. 2.

Figure 6G:
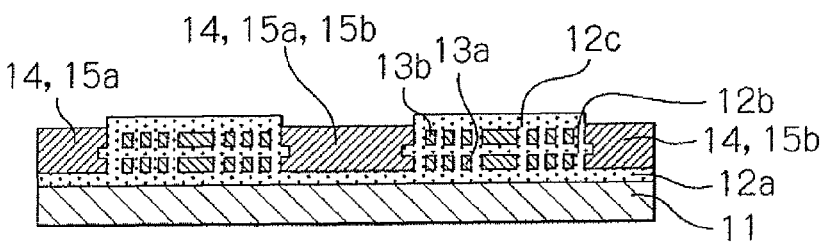

Next, as shown in FIG. 6g, a third insulation film 12c with a thickness of about 3.0 to 20 μm is formed thereon by spin-coating a polyimide resin material thereon, by patterning the coated polyimide resin itself and by thermally curing the polyimide resin pattern.

Figure 6H:
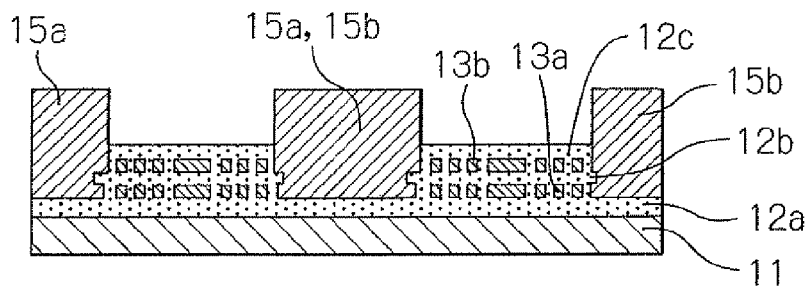

Then, as shown in FIG. 6h, a resist pattern (not shown) is formed on the third insulation film 12c, an inner electrode 15 constituted by the first to fourth inner electrode layers 15a to 15d, having a thickness of about 5.0 to 200 μm, is additionally formed by performing electrolyte plating or electroless plating of a conductive material such as Cu, Au, Al or Ag, and thereafter the resist pattern is removed.

Figure 6I:
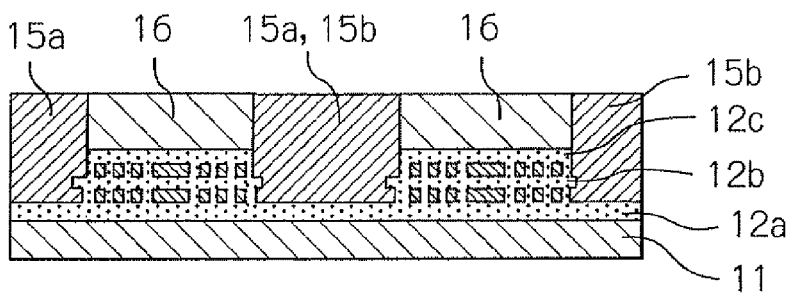

Thereafter, as shown in FIG. 6i, a ferrite-resin compound layer 16 with a thickness of about 5.0 to 200 μm is formed thereon by coating an epoxy resin material containing ferrite particles, by thermally curing the epoxy resin, and by polishing the surface of the cured ferrite-resin compound.

Figure 6J:
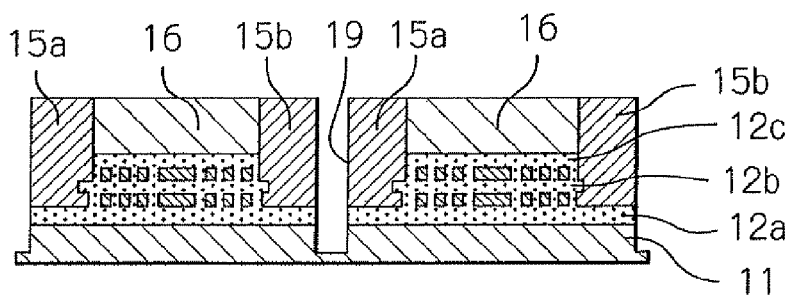

Then, as shown in FIG. 6j, deep grooves 19 are formed on the substrate 11 using a rotational cutting tool for grooving. Each deep groove 19 has a depth deeper than that of the shallow groove 18 in the embodiment shown in FIGS. 1a, 1b and 1c and is formed between the common mode choke coils slightly coupled to each other to have a width of for example about 70 μm without completely separating the substrate 11 into the individual common mode choke coils. By forming the deep groove 19 on the substrate 11, the side surfaces 10b and 10c of each common mode choke coil 10 is exposed. Particularly, forming the deep groove 19 at the position of the inner electrode 15 configured by the first to fourth inner electrode layers 15a to 15d, as this embodiment, a part of these first to fourth inner electrode layers 15a to 15d is exposed to the side surfaces 10b and 10c. Another part of these first to fourth inner electrode layers 15a to 15d is also exposed to the upper surface 10a of the common mode choke coil 10.

Figure 6K:
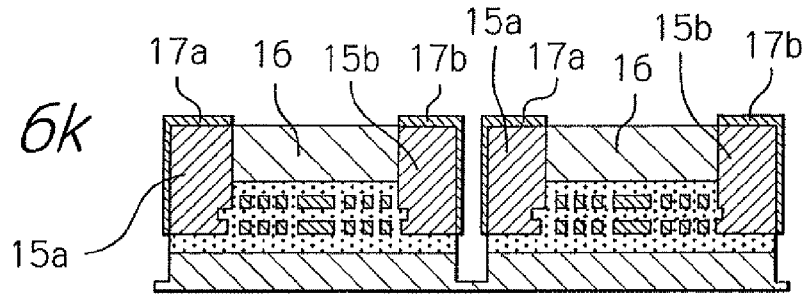

Next, as shown in FIG. 6k, a multilayer of Ni/Au (Ni is lower layer and Au is upper layer) is formed by sequentially performing electrolyte plating or electroless plating of Ni and Au in this order, or a single layer of Sn is formed by performing electrolyte plating or electroless plating of Sn, to coat the first to fourth inner electrode layers 15a to 15d exposed on the upper surface 10a and the side surfaces 10b and 10c of the common mode choke coil 10. Thus, the external electrodes 17 configured by the first to fourth external electrode films 17a to 17d, each having a L-shaped section and a thickness of about 1.0 to 10 µm are formed. In a desired example, the external electrodes may be formed from a multilayer of Ni film with a thickness of 3 µm and Au film laminated thereon with a thickness of 0.1 µm.

Figure 6L:
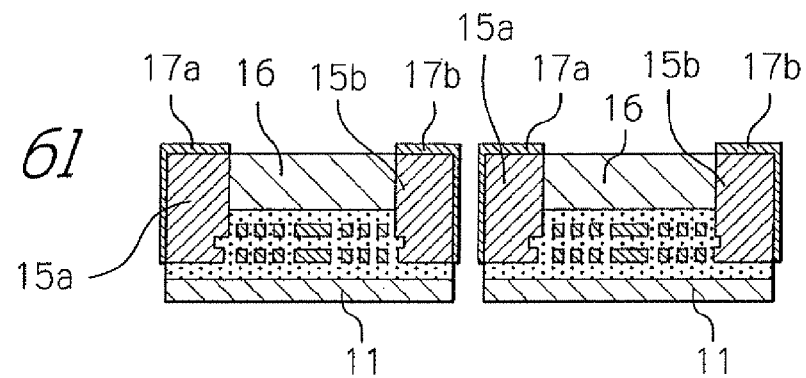

Then, as shown in FIG. 6l, the rear surface of the substrate 11 is ground to completely separate the substrate 11 into individual common mode choke coils at the position of the deep groove 19.

As described in detail, according to this embodiment, forming of deep grooves on the substrate 11 is performed so that side surfaces of each common mode choke coil are exposed before separating it into individual common mode choke coils, then the first to fourth external electrode films 17a to 17d are plated on the respective first to fourth inner electrode layers 15a to 15d exposed on the side surfaces and upper surface, and thereafter the rear surface of the substrate 11 is ground to completely separate the substrate 11 at the deep groove into individual common mode choke coils. Since the external electrodes are thus formed before separating the substrate into individual common mode choke coils, it is possible to precisely form the shape, dimensions and position of each external electrode and to more miniaturize the common mode choke coil. Also, since the manufacturing process is not separated into a process for fabricating elements on a substrate and a process performed after the separation of the substrate into individual common mode choke coil chips, the manufacturing cost will not be increased. Further, because each external electrode has a L-shaped section formed by partially coating not only the upper surface of the common mode choke coil but also the side surface of the common mode choke coil, a large area of the electrode can be obtained to provide enough strength in soldering joint for mounting on a printed circuit board. Still further, since the common mode choke coil of this embodiment does not have two ferrite substrates superimposed to face each other as the conventional common mode choke coil, it is possible to have a lower height.

FIGS. 7a to 7l schematically illustrate manufacturing processes of a common mode choke coil as further embodiment of an electronic component according to the present invention. Hereinafter, using these figures, the manufacturing process of the common mode choke coil in this embodiment will be described. FIGS. 7a to 7l only show two neighboring common mode choke coils. In the description of this embodiment, components similar to these in the embodiment shown in FIGS. 1a, 1b and 1c are indicated by using the same reference numerals.

Figure 7A:
FIGS. 7a to 7l show sectional views schematically illustrating manufacturing processes of a common mode choke coil as further embodiment of an electronic component according to the present invention.

As shown in FIG. 7a, first, a ferrite substrate 11 with a thickness of about 0.1 to 2.0 mm is formed by sintering a ferrite material such as Ni—Zn ferrite, by cutting the sintered ferrite body, by machining the cut ferrite body and by lapping the machined ferrite body.

Figure 7B:
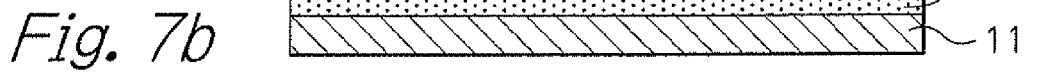

Then, as shown in FIG. 7b, a first insulation film 12a with a thickness of about 1.0 to 10 µm is formed on the whole surface of the substrate 11 by spin-coating a polyimide resin material over the whole surface of the substrate and by thermally curing the coated polyimide.

Figure 7C:
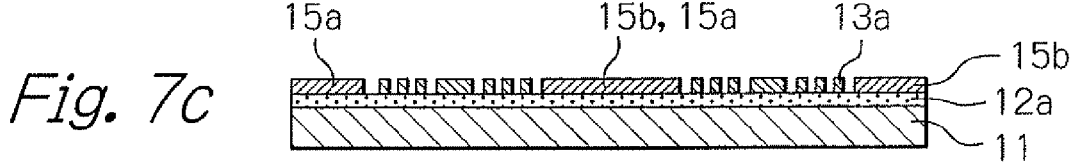

Next, as shown in FIG. 7c, a plating seed film (not shown) is formed on the first insulation film 12a by sputtering, and a resist pattern (not shown) is formed thereon. Then, a first coil conductor film 13a and a part of first to fourth inner electrode layers 15a to 15d, having a thickness of about 5.0 to 20 µm, are formed by performing electrolyte plating or electroless plating of a conductive material such as Cu, Au, Al or Ag, and thereafter the resist pattern and the plating seed film under it are removed.

Figure 7D:
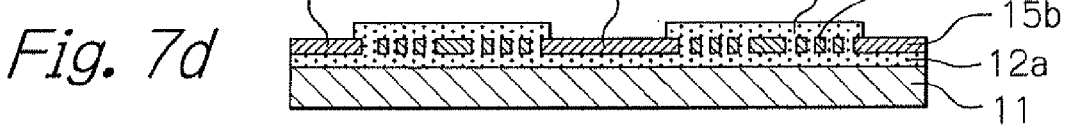

Then, as shown in FIG. 7d, a second insulation film 12b with a thickness of about 3.0 to 20 µm is formed thereon by spin-coating a polyimide resin material thereon, by patterning the coated polyimide resin itself and by thermally curing the polyimide resin pattern.

Figure 7E:
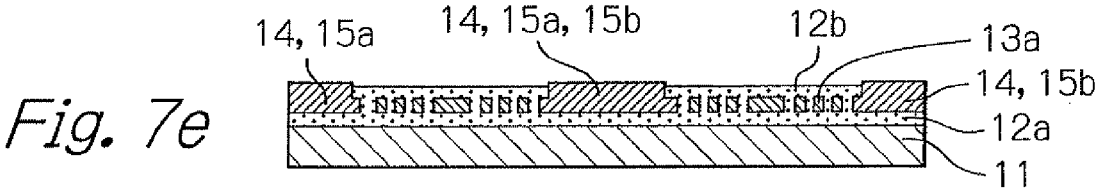

Next, as shown in FIG. 7e, a plating seed film (not shown) is formed by sputtering, and a resist pattern (not shown) is formed thereon. Then, a lead conductor layer 14 and a part of the first to fourth inner electrode layers 15a to 15d, having a thickness of about 5.0 to 20 µm, are formed by performing electrolyte plating or electroless plating of a conductive material such as Cu, Au, Al or Ag, and thereafter the resist pattern and the plating seed film under it are removed.

Figure 7F:
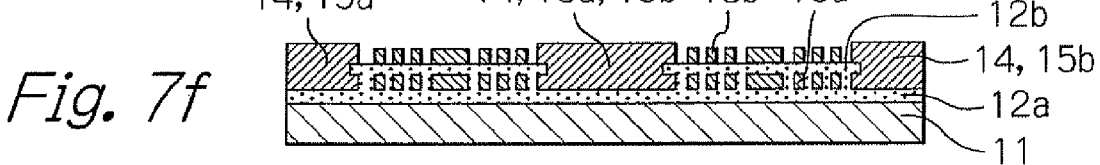

Then, as shown in FIG. 7f, a plating seed film (not shown) is formed on the second insulation film 12b by sputtering, and a resist pattern (not shown) is formed thereon. Then, a second coil conductor film 13b, having a thickness of about 5.0 to 20 µm, is formed by performing electrolyte plating or electroless plating of a conductive material such as Cu, Au, Al or Ag, and thereafter the resist pattern and the plating seed film under it are removed. It should be noted that the lead conductor layer 14 is extended to the center region of the common mode choke coil 10 and that there is the second insulation film 12b between the lead conductor layer 14 and the second coil conductor film 13b intersected with this lead conductor layer 14, as shown in FIG. 2.

Figure 7G:
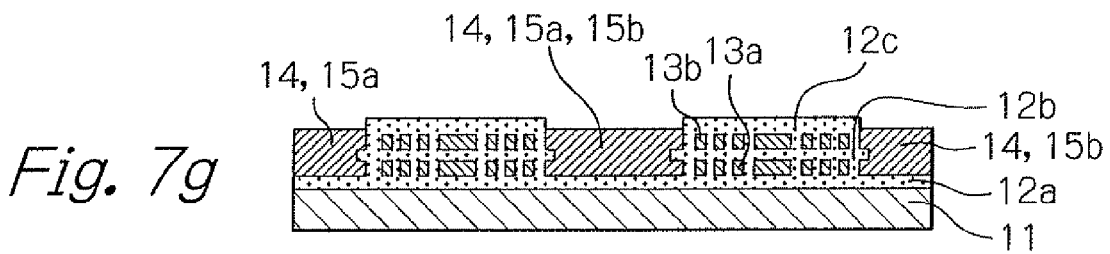

Next, as shown in FIG. 7g, a third insulation film 12c with a thickness of about 3.0 to 20 µm is formed thereon by spin-coating a polyimide resin material thereon, by patterning the coated polyimide resin itself and by thermally curing the polyimide resin pattern.

Figure 7H:
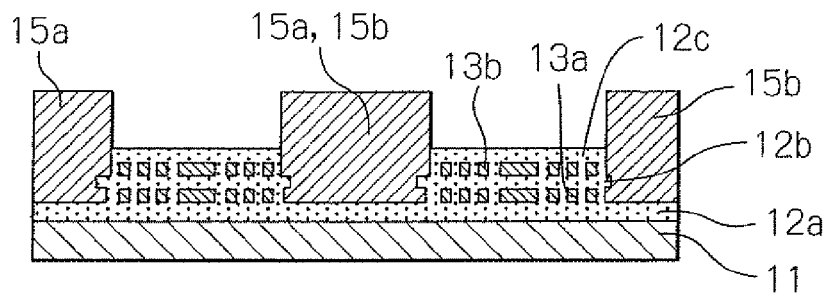

Then, as shown in FIG. 7h, a resist pattern (not shown) is formed on the third insulation film 12c, an inner electrode 15 constituted by the first to fourth inner electrode layers 15a to 15d, having a thickness of about 5.0 to 200 µm, is additionally formed by performing electrolyte plating or electroless plating of a conductive material such as Cu, Au, Al or Ag, and thereafter the resist pattern is removed.

Figure 7I:
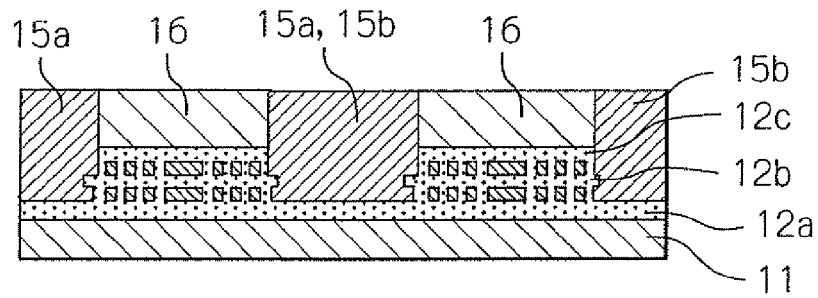

Thereafter, as shown in FIG. 7i, a ferrite-resin compound layer 16 with a thickness of about 5.0 to 200 µm is formed thereon by coating an epoxy resin material containing ferrite particles, by thermally curing the epoxy resin, and by polishing the surface of the cured ferrite-resin compound.

Figure 7J:
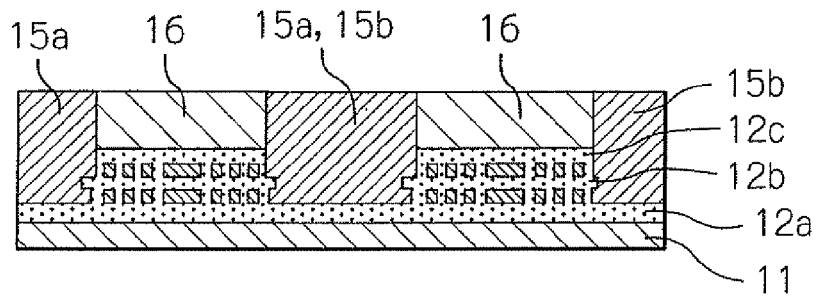

Then, as shown in FIG. 7j, the rear surface of the substrate 11 is ground to reduce its thickness. For example, in case that the thickness of the substrate 11 before grinding is 1.5 mm, the rear surface of the substrate 11 is ground to have the thickness of about 0.2 to 0.8 mm.

Figure 7K:
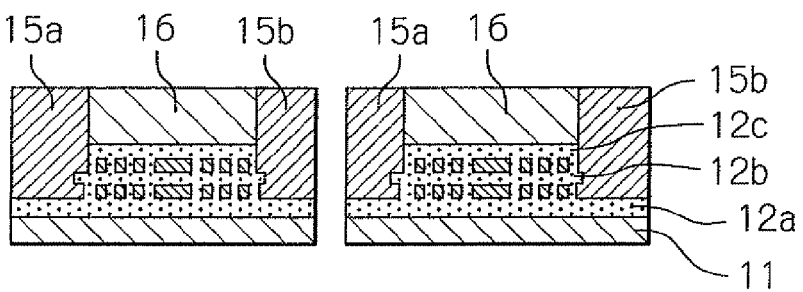

Then, as shown in FIG. 7k, the substrate 11 is cut to completely separate the substrate 11 into individual common mode choke coils using a rotational cutting tool for cutting. By this separation of the substrate 11, the side surfaces 10b and 10c of each common mode choke coil 10 is exposed and also a part of the first to fourth inner electrode layers 15a to 15d is exposed to the side surfaces 10b and 10c. Another part of these first to fourth inner electrode layers 15a to 15d is also exposed to the upper surface 10a of the common mode choke coil 10.

Figure 7L:
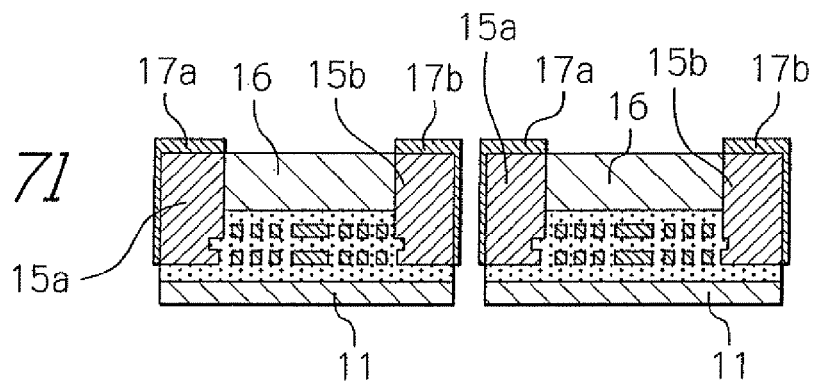

Next, as shown in FIG. 7l, the external electrodes are formed by barrel-plating on the separated individual common mode choke coils. Namely, by this barrel-plating, a multilayer of Ni/Au (Ni is lower layer and Au is upper layer) is formed by sequentially performing electrolyte plating or electroless plating of Ni and Au in this order, or a single layer of Sn is formed by performing electrolyte plating or electroless plating of Sn, to coat the first to fourth inner electrode layers 15a to 15d exposed on the upper surface 10a and the side surfaces 10b and 10c of the common mode choke coil 10. Thus, the external electrodes 17 configured by the first to fourth external electrode films 17a to 17d, each having a L-shaped section and a thickness of about 1.0 to 10 μm are formed. In a desired example, the external electrodes may be formed from a multilayer of Ni film with a thickness of 3 μm and Au film laminated thereon with a thickness of 0.1 μm.

As described in detail, according to this embodiment, a plurality of common mode choke coils formed on the substrate 11 are separated into individual common mode choke coils so that side surfaces of each common mode choke coil are exposed, then the first to fourth external electrode films 17a to 17d are formed by barrel-plating on the respective first to fourth inner electrode layers 15a to 15d exposed on the side surfaces and upper surface. Since the external electrodes are thus formed by barrel-plating on the exposed inner electrodes, it is possible to precisely form the shape, dimensions and position of each external electrode and to more miniaturize the common mode choke coil. Also, because each external electrode has a L-shaped section formed by partially coating not only the upper surface of the common mode choke coil but also the side surface of the common mode choke coil, a large area of the electrode can be obtained to provide enough strength in soldering joint for mounting on a printed circuit board. Still further, since the common mode choke coil of this embodiment does not have two ferrite substrates superimposed to face each other as the conventional common mode choke coil, it is possible to have a lower height.

FIGS. 8a to 8m schematically illustrate manufacturing processes of a common mode choke coil as still further embodiment of an electronic component according to the present invention. Hereinafter, using these figures, the manufacturing process of the common mode choke coil in this embodiment will be described. FIGS. 8a to 8m only show two neighboring common mode choke coils. In the description of this embodiment, components similar to these in the embodiment shown in FIGS. 1a, 1b and 1c are indicated by using the same reference numerals.

Figure 8A:
FIGS. 8a to 8m show sectional views schematically illustrating manufacturing processes of a common mode choke coil as still further embodiment of an electronic component according to the present invention.

As shown in FIG. 8a, first, a ferrite substrate 11 with a thickness of about 0.1 to 2.0 mm is formed by sintering a ferrite material such as Ni—Zn ferrite, by cutting the sintered ferrite body, by machining the cut ferrite body and by lapping the machined ferrite body.

Figure 8B:
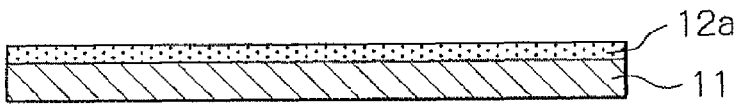

Then, as shown in FIG. 8b, a first insulation film 12a with a thickness of about 1.0 to 10 μm is formed on the whole surface of the substrate 11 by spin-coating a polyimide resin material over the whole surface of the substrate and by thermally curing the coated polyimide.

Figure 8C:
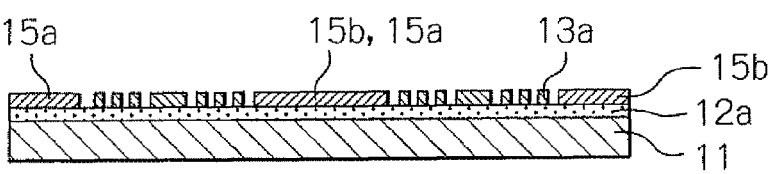

Next, as shown in FIG. 8c, a plating seed film (not shown) is formed on the first insulation film 12a by sputtering, and a resist pattern (not shown) is formed thereon. Then, a first coil conductor film 13a and a part of first to fourth inner electrode layers 15a to 15d, having a thickness of about 5.0 to 20 μm, are formed by performing electrolyte plating or electroless plating of a conductive material such as Cu, Au, Al or Ag, and thereafter the resist pattern and the plating seed film under it are removed.

Figure 8D:
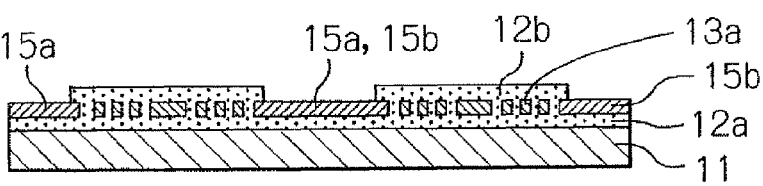

Then, as shown in FIG. 8d, a second insulation film 12b with a thickness of about 3.0 to 20 μm is formed thereon by spin-coating a polyimide resin material thereon, by patterning the coated polyimide resin itself and by thermally curing the polyimide resin pattern.

Figure 8E:
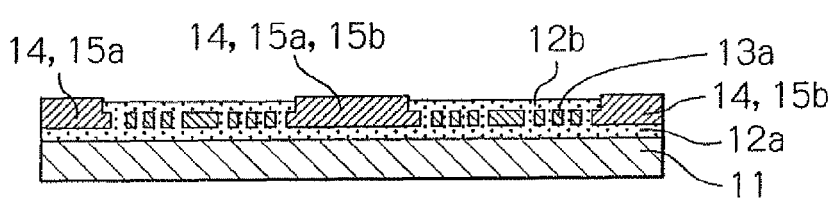

Next, as shown in FIG. 8e, a plating seed film (not shown) is formed by sputtering, and a resist pattern (not shown) is formed thereon. Then, a lead conductor layer 14 and a part of the first to fourth inner electrode layers 15a to 15d, having a thickness of about 5.0 to 20 μm, are formed by performing electrolyte plating or electroless plating of a conductive material such as Cu, Au, Al or Ag, and thereafter the resist pattern and the plating seed film under it are removed.

Figure 8F:
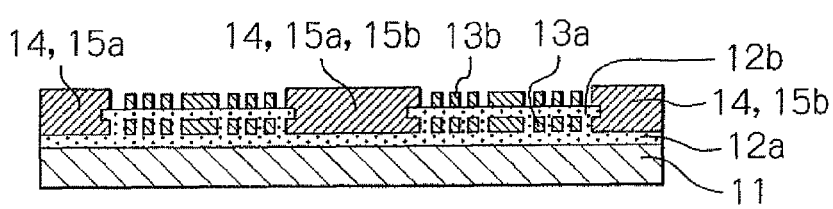

Then, as shown in FIG. 8f, a plating seed film (not shown) is formed on the second insulation film 12b by sputtering, and a resist pattern (not shown) is formed thereon. Then, a second coil conductor film 13b, having a thickness of about 5.0 to 20 μm, is formed by performing electrolyte plating or electroless plating of a conductive material such as Cu, Au, Al or Ag, and thereafter the resist pattern and the plating seed film under it are removed. It should be noted that the lead conductor layer 14 is extended to the center region of the common mode choke coil 10 and that there is the second insulation film 12b between the lead conductor layer 14 and the second coil conductor film 13b intersected with this lead conductor layer 14, as shown in FIG. 2.

Figure 8G:
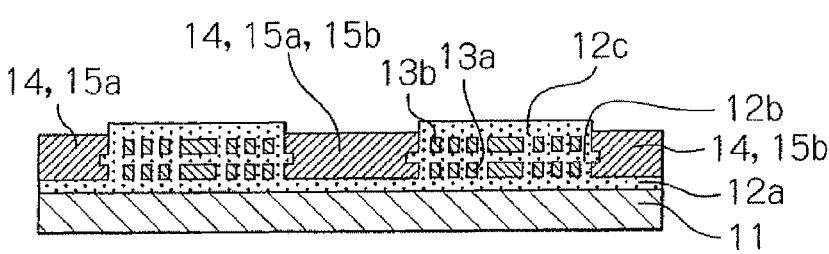

Next, as shown in FIG. 8g, a third insulation film 12c with a thickness of about 3.0 to 20 μm is formed thereon by spin-coating a polyimide resin material thereon, by patterning the coated polyimide resin itself and by thermally curing the polyimide resin pattern.

Figure 8H:
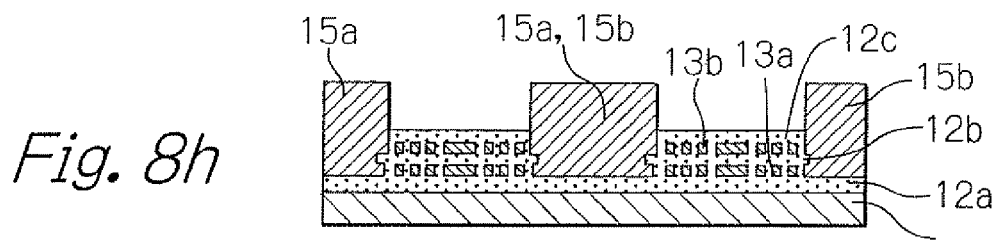

Then, as shown in FIG. 8h, a resist pattern (not shown) is formed on the third insulation film 12c, an inner electrode 15 constituted by the first to fourth inner electrode layers 15a to 15d, having a thickness of about 5.0 to 200 μm, is additionally formed by performing electrolyte plating or electroless plating of a conductive material such as Cu, Au, Al or Ag, and thereafter the resist pattern is removed.

Figure 8I:
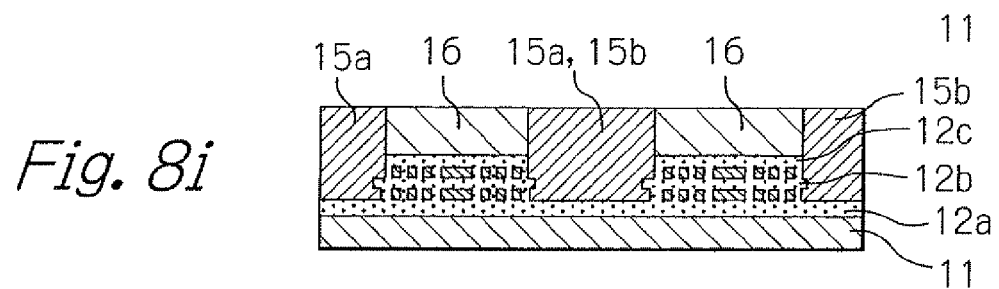

Thereafter, as shown in FIG. 8i, a ferrite-resin compound layer 16 with a thickness of about 5.0 to 200 μm is formed thereon by coating an epoxy resin material containing ferrite particles, by thermally curing the epoxy resin, and by polishing the surface of the cured ferrite-resin compound.

Figure 8J:
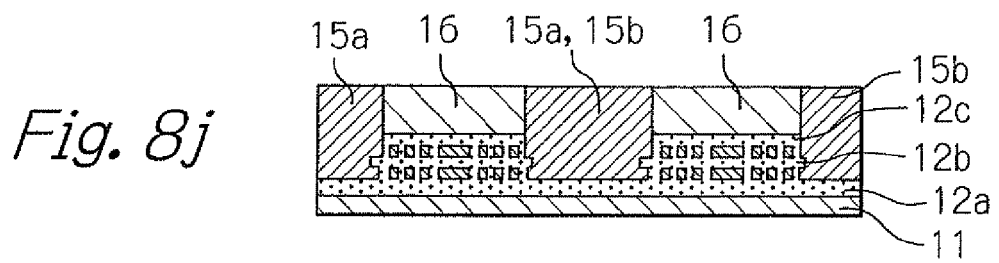

Then, as shown in FIG. 8j, the rear surface of the substrate 11 is ground to reduce its thickness. For example, in case that the thickness of the substrate 11 before grinding is 1.5 mm, the rear surface of the substrate 11 is ground to have the thickness of about 0.2 to 0.8 mm.

Figure 8K:
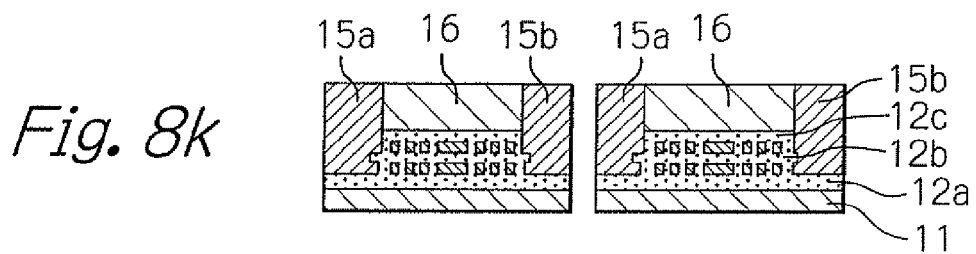

Then, as shown in FIG. 8k, the substrate 11 is cut to completely separate the substrate 11 into individual common mode choke coils using a rotational cutting tool for cutting. By this separation of the substrate 11, the side surfaces 10b and 10c of each common mode choke coil 10 is exposed and also a part of the first to fourth inner electrode layers 15a to 15d is exposed to the side surfaces 10b and 10c. Another part of these first to fourth inner electrode layers 15a to 15d is also exposed to the upper surface 10a of the common mode choke coil 10.

Figure 8L:
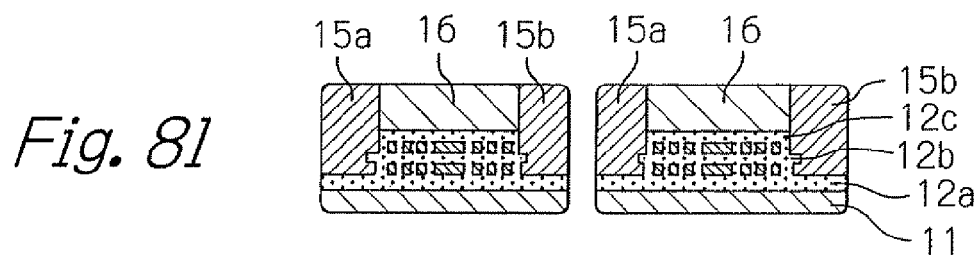

Next, as shown in FIG. 8l, barrel-polishing is performed for the separated individual common mode choke coils to cut off or chamfer edges of the common mode choke coils. Thanks for such chamfering, each common mode choke coil can be smoothly loaded on a parts-feeder.

Figure 8M:
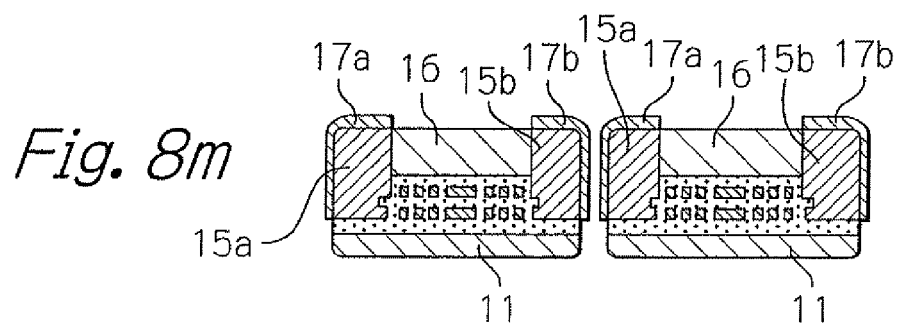

Then, as shown in FIG. 8m, the external electrodes are formed by barrel-plating on the chamfered individual common mode choke coils. Namely, by this barrel-plating, a multilayer of Ni/Au (Ni is lower layer and Au is upper layer) is formed by sequentially performing electrolyte plating or electroless plating of Ni and Au in this order, or a single layer of Sn is formed by performing electrolyte plating or electroless plating of Sn, to coat the first to fourth inner electrode layers 15a to 15d exposed on the upper surface 10a and the side surfaces 10b and 10c of the common mode choke coil 10. Thus, the external electrodes 17 configured by the first to fourth external electrode films 17a to 17d, each having a L-shaped section and a thickness of about 1.0 to 10 μm are formed. In a desired example, the external electrodes may be formed from a multilayer of Ni film with a thickness of 3 μm and Au film laminated thereon with a thickness of 0.1 μm.

As described in detail, according to this embodiment, a plurality of common mode choke coils formed on the substrate 11 are separated into individual common mode choke coils so that side surfaces of each common mode choke coil are exposed, then barrel-polishing is performed to chamfer the separated individual common mode choke coils, and thereafter the first to fourth external electrode films 17a to 17d are formed by barrel-plating on the respective first to fourth inner electrode layers 15a to 15d exposed on the side surfaces and upper surface. Because the chamfering of edges is performed before forming of the external electrodes, no burr will be existed at the edges and therefore no failure will occur when the common mode choke coils are loaded on the parts-feeder. Also, since the external electrodes are formed by barrel-plating on the exposed inner electrodes, it is possible to precisely form the shape, dimensions and position of each external electrode and to more miniaturize the common mode choke coil. Further, because each external electrode has a L-shaped section formed by partially coating not only the upper surface of the common mode choke coil but also the side surface of the common mode choke coil, a large area of the electrode can be obtained to provide enough strength in soldering joint for mounting on a printed circuit board. Still further, since the common mode choke coil of this embodiment does not have two ferrite substrates superimposed to face each other as the conventional common mode choke coil, it is possible to have a lower height.

Figure 9A:
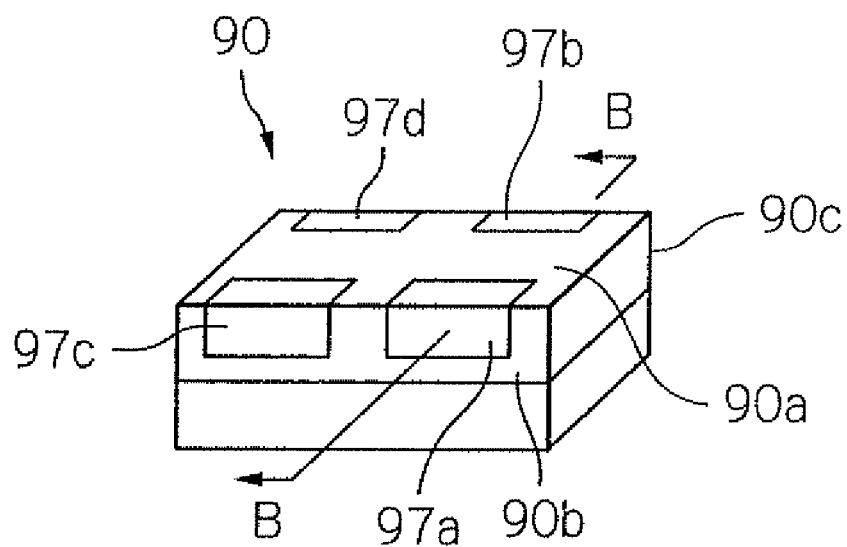
FIGS. 9a and 9b show an external perspective view and a B-B line sectional view schematically illustrating configuration of a common mode choke coil as further embodiment of an electronic component according to the present invention.
Figure 9B:
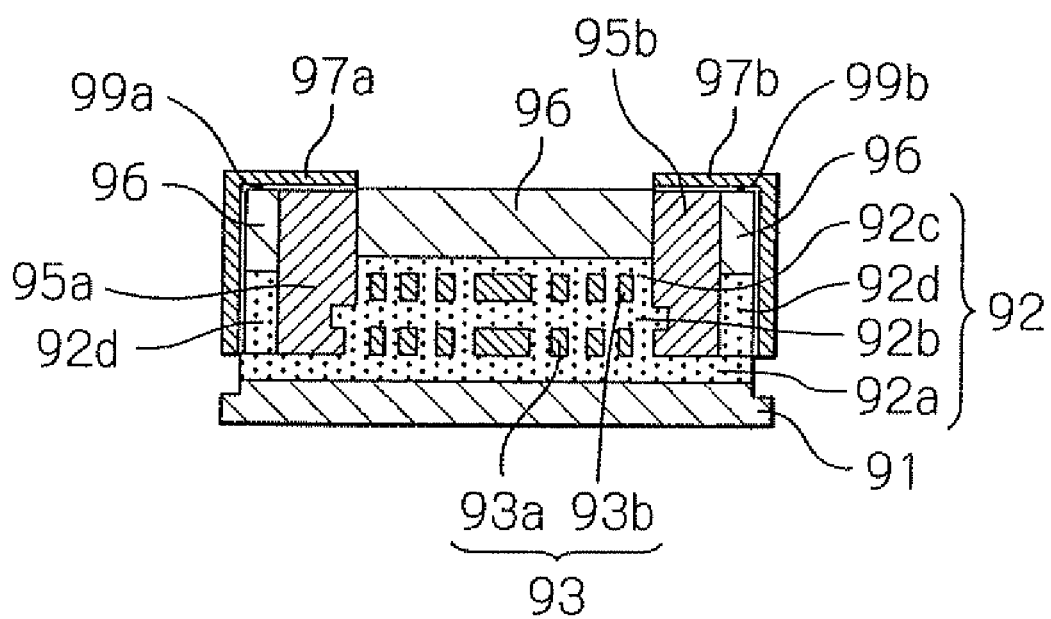

FIGS. 9a and 9b schematically illustrate configuration of a common mode choke coil as further embodiment of an electronic component according to the present invention. FIG. 9a shows an external perspective view and FIG. 9b shows a B-B line section. It should be noted that the B-B line section of FIG. 9b corresponds to a section where external electrodes are existed. The common mode choke coil in this embodiment has somewhat different configurations in an inner electrode and in external electrodes as those in the embodiment shown in FIGS. 1a, 1b and 1c, but another configurations of the common mode choke coil in this embodiment are substantially the same as that in the embodiment shown in FIGS. 1a, 1b and 1c.

In FIGS. 9a and 9b, reference numeral 90 denotes a common mode choke coil, 91 denotes a ferrite substrate, 92 denotes an insulation layer laminated on the ferrite substrate 91 and configured by a first insulation film 92a, a second insulation film 92b, a third insulation film 92c and a fourth insulation film 92d, 93 denotes a coil conductor layer surrounded by the insulation layer 92 and configured by a first coil conductor film 93a and a second coil conductor film 93b, 95a and 95b denote first and second inner electrode layers come to a part of an upper surface 90a of the common mode choke coil 90 (third and fourth inner electrode layers are also formed but not shown in the figures), 96 denotes a ferrite-resin compound layer laminated on the insulation layer 92 and containing a ferrite material, 99a and 99b denote first and second lower conductor films for external electrodes, which are formed to coat the first and second inner electrode layers 95a and 95b on the upper surface 90a of the common mode choke coil 90 and formed on a part of side surfaces of the fourth insulation film 92d on the side surfaces 90b and 90c of the common mode choke coil 90 (third and fourth lower conductor films are also formed but not shown in the figures), and 97a and 97b denote first and second upper conductor films for external electrodes, which are formed to coat the first and second lower conductor films for external electrodes 99a and 99b (third and fourth upper conductor films are also formed but not shown in the figures), respectively.

As is well known, a common mode choke coil is an electronic component used for suppressing a common mode current causing electromagnetic interference in a balanced transmission system. The common mode choke coil in this embodiment is a surface mounting component having a substantially rectangular parallelepiped outer shape and four external electrodes formed on its upper surface and side surfaces. The size of its bottom is approximately 0.6 mm×0.3 mm, and its height is approximately 0.3 mm.

In this embodiment, the ferrite substrate 91 is formed of a sintered ferrite body such as a Ni—Zn ferrite, the insulation layer 92 is made of a thermally cured polyimide resin, the coil conductor 93, a lead conductor layer (not shown) and the first and second inner electrode layers 95a and 95b are made of a conductive material such as Cu, Au, Al or Ag, and the ferrite-resin compound layer 96 is made of an epoxy resin material containing ferrite particles. Each of the first and second lower conductor films for external electrodes 99a and 99b is fabricated in this embodiment from a multilayer of conductive material of a Cu film and a chrome (Cr) film laminated on the Cu film or of a Cu film and a titanium (Ti) film laminated on the Cu film. Also, in this embodiment, each of the first and second upper conductor films for external electrodes 97a and 97b is fabricated from a multilayer of conductive materials of a Ni film and an Au film laminated on the Ni film, or from a single layer of conductive material such as Sn.

Figure 10A:
FIGS. 10a to 10n show sectional views schematically illustrating manufacturing processes of the common mode choke coil of the embodiment shown in FIGS. 9a and 9b.
Figure 10B:
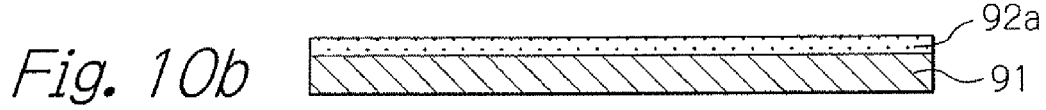
Figure 10C:
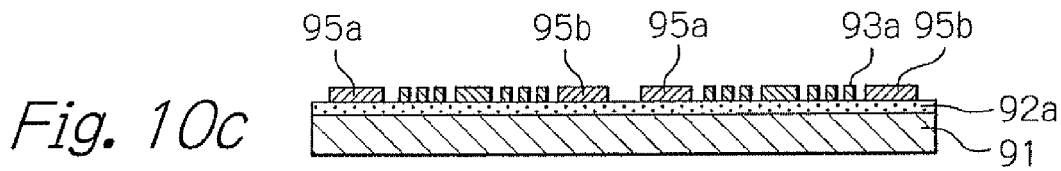
Figure 10D:
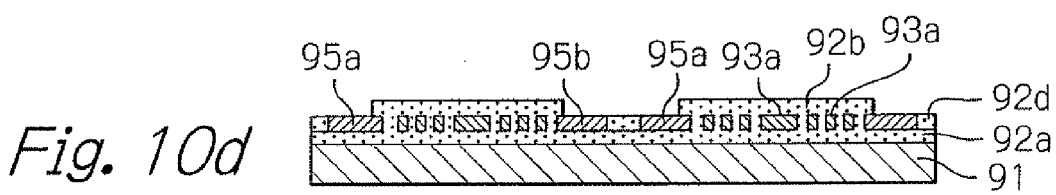
Figure 10E:
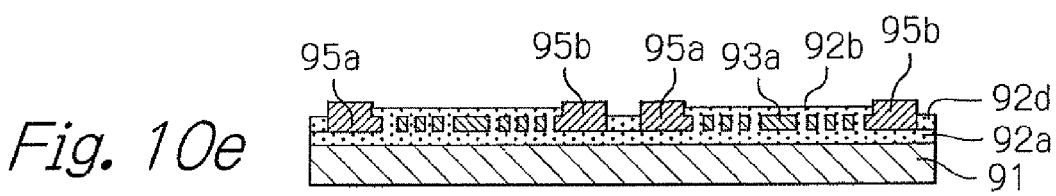
Figure 10F:
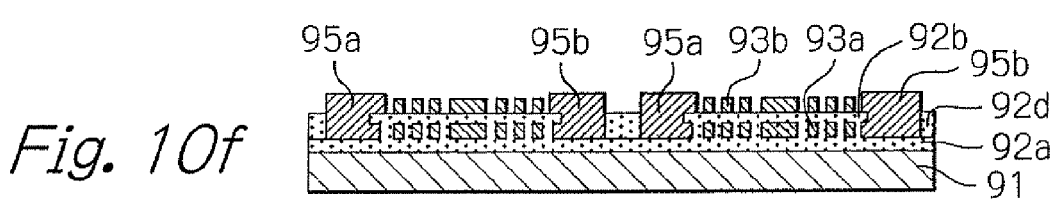
Figure 10G:
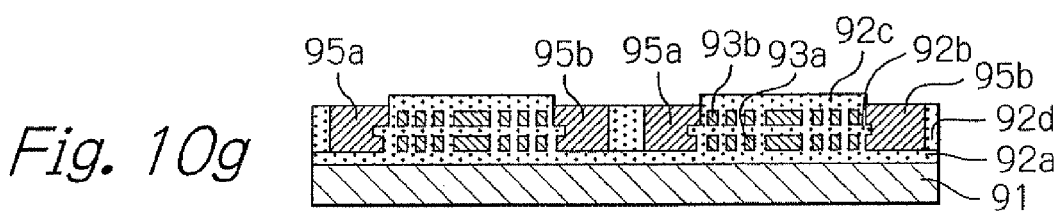
Figure 10H:
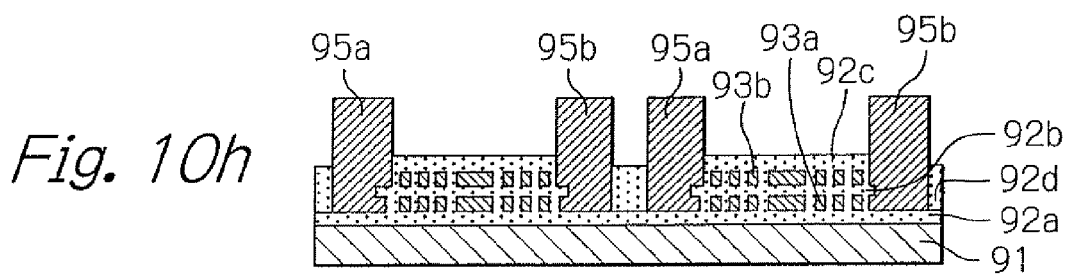
Figure 10I:
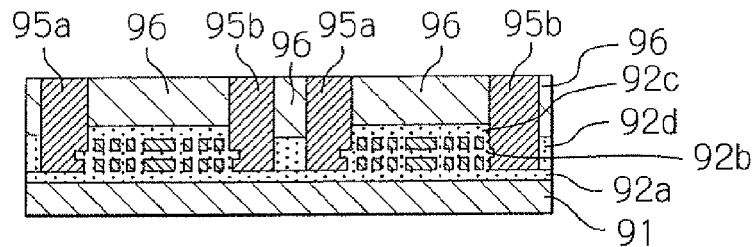
Figure 10J:
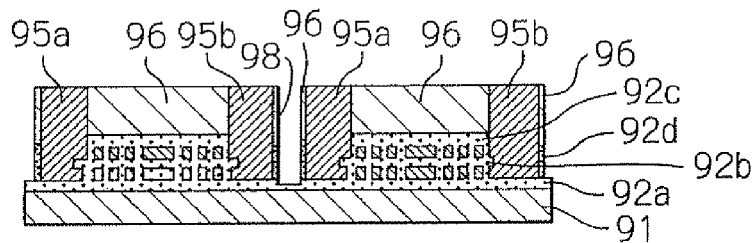
Figure 10K:
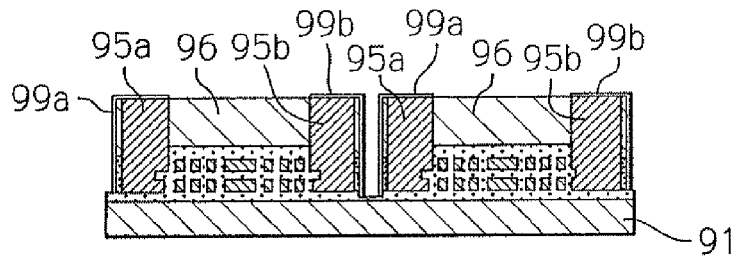
Figure 10L:
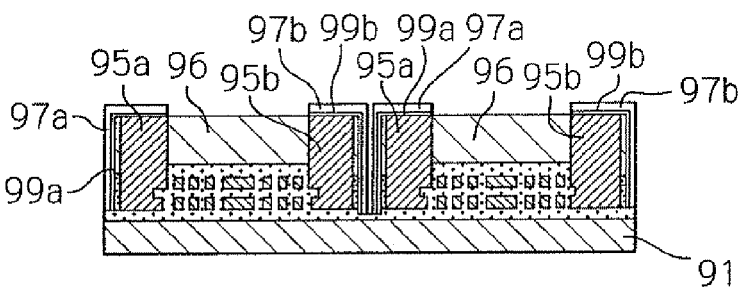
Figure 10M:
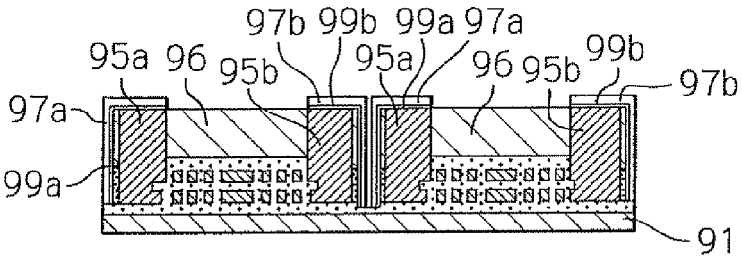
Figure 10N:
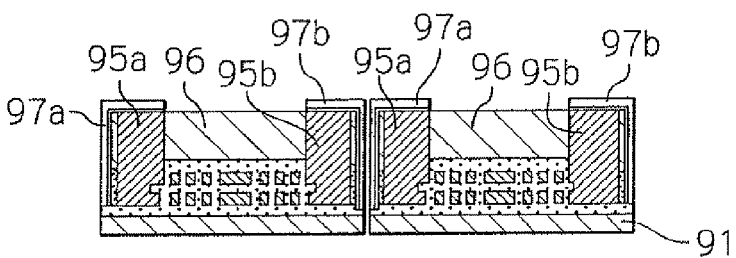

FIGS. 10a to 10n schematically illustrate manufacturing processes of the common mode choke coil of the embodiment shown in FIGS. 9a and 9b. Note that FIGS. 10a to 10n correspond to a section where the external electrodes are existed. FIGS. 10a to 10n only show two neighboring common mode choke coils. Hereinafter, using these figures, the manufacturing process of the common mode choke coil in this embodiment will be described.

As shown in FIG. 10a, first, a ferrite substrate 91 with a thickness of about 0.1 to 2.0 mm is formed by sintering a ferrite material such as Ni—Zn ferrite, by cutting the sintered ferrite body, by machining the cut ferrite body and by lapping the machined ferrite body.

Then, as shown in FIG. 10b, a first insulation film 92a with a thickness of about 1.0 to 10 μm is formed on the whole surface of the substrate 91 by spin-coating a polyimide resin material over the whole surface of the substrate and by thermally curing the coated polyimide.

Next, as shown in FIG. 10c, a plating seed film (not shown) is formed on the first insulation film 92a by sputtering, and a resist pattern (not shown) is formed thereon. Then, a first coil conductor film 93a and a part of first and second inner electrode layers 95a and 95b (also third and fourth inner electrode layers), having a thickness of about 5.0 to 20 μm, are formed by performing electrolyte plating or electroless plating of a conductive material such as Cu, Au, Al or Ag, and thereafter the resist pattern and the plating seed film under it are removed.

Then, as shown in FIG. 10d, a second insulation film 92b and a fourth insulation film 92d with a thickness of about 3.0 to 20 μm are formed thereon by spin-coating a polyimide resin material thereon, by patterning the coated polyimide resin itself and by thermally curing the polyimide resin pattern.

Next, as shown in FIG. 10e, a plating seed film (not shown) is formed by sputtering, and a resist pattern (not shown) is formed thereon. Then, a lead conductor layer (not shown) and a part of the first and second inner electrode layers 95a and 95b (also third and fourth inner electrode layers), having a thickness of about 5.0 to 20 μm, are formed by performing electrolyte plating or electroless plating of a conductive material such as Cu, Au, Al or Ag, and thereafter the resist pattern and the plating seed film under it are removed.

Then, as shown in FIG. 10f, a plating seed film (not shown) is formed on the second insulation film 92b by sputtering, and a resist pattern (not shown) is formed thereon. Then, a second coil conductor film 93b, having a thickness of about 5.0 to 20 μm, is formed by performing electrolyte plating or electroless plating of a conductive material such as Cu, Au, Al or Ag, and thereafter the resist pattern and the plating seed film under it are removed. It should be noted that the lead conductor layer is extended to the center region of the common mode choke coil 90 and that there is the second insulation film 92b between the lead conductor layer and the second coil conductor film 93b intersected with this lead conductor layer, as shown in FIG. 2.

Next, as shown in FIG. 10g, a third insulation film 92c with a thickness of about 3.0 to 20 μm is formed thereon and a thickness of the fourth insulation film 92d is increased by spin-coating a polyimide resin material thereon, by patterning the coated polyimide resin itself and by thermally curing the polyimide resin pattern.

Then, as shown in FIG. 10h, a resist pattern (not shown) is formed on the third insulation film 92c, the first and second inner electrode layers 95a and 95b (also third and fourth inner electrode layers), having a thickness of about 5.0 to 200 μm, is additionally formed by performing electrolyte plating or electroless plating of a conductive material such as Cu, Au, Al or Ag, and thereafter the resist pattern is removed. It should be noted that until this stage, in other words, until the height of the first and second inner electrode layers 95a and 95b (also third and fourth inner electrode layers) becomes the same as that of the second coil conductor film 93b, these first and second inner electrode layers 95a and 95b (also third and fourth inner electrode layers) will not be exposed to side surfaces 90b and 90c of each common mode choke coil.

Thereafter, as shown in FIG. 10i, a ferrite-resin compound layer 96 with a thickness of about 5.0 to 200 μm is formed thereon by coating an epoxy resin material containing ferrite particles, by thermally curing the epoxy resin, and by polishing the surface of the cured ferrite-resin compound.

Then, as shown in FIG. 10j, shallow grooves 98 are formed on the substrate 91 using a rotational cutting tool for grooving. Each shallow groove 98 is formed between the common mode choke coils coupled to each other to have a width of for example about 70 μm without completely separating the substrate 91 into the individual common mode choke coils. By forming the shallow groove 98 on the substrate 91, the side surfaces 90b and 90c of each common mode choke coil 90 is exposed. Also, because the shallow groove 98 is formed at the position of the ferrite-resin compound layer 96 and the fourth insulation layer 92d, a part of the ferrite-resin compound layer 96 and the fourth insulation layer 92d is exposed to the side surfaces 90b and 90c. It should be noted that the first and second inner electrode layers 95a and 95b (also third and fourth inner electrode layers) are not exposed to the side surfaces 90b and 90c of each common mode choke coil but a part of them is exposed to only the upper surface 90a. Since the shallow groove machining is performed at the position of the insulation material of such as polyimide resin and epoxy resin, no clogging of the rotational cutting tool for grooving will occur and also an enough margin for grooving will be ensured.

Next, as shown in FIG. 10k, the first and second lower conductor films for external electrodes 99a and 99b are formed by sputtering to coat the first and second inner electrode layers 95a and 95b at the upper surface 90a of the common mode choke coil 90 and to coat a part of the side surface of the fourth insulation layer 92d at the side surfaces 90b and 90c of the common mode choke coil 90. More concretely, a mask (not shown) having a rectangular shaped opening that extends over the neighboring two inner electrodes (95a to 95d) exposed to the upper surfaces of the two common mode choke coils 90 faced to each other through the shallow groove 98 is formed on the upper surfaces of the common mode choke coils 90. Then, a multilayer of Cu/Cr (Cu is lower layer and Cr is upper layer) or Cu/Ti (Cu is lower layer and Ti is upper layer) is deposited on the upper surfaces of the two inner electrodes (95a to 95d), on the upper ends of the epoxy resin side layers containing ferrite particles and on the both side surfaces of the inner electrodes exposed to the shallow graves 98, by sputtering directed perpendicular to the upper surface to form the first and second lower conductor films for external electrodes 99a and 99b (third and fourth lower conductor films for external electrodes are also formed but not shown in the figures) with a L-shaped section and a thickness of about 100 to 10,000 nm. If a three-dimensional mask for covering a part of the side surfaces of the inner electrodes exposed to the shallow graves 98 is used, it is possible to form first and second lower conductor films for external electrodes 99a and 99b with a precise shape.

Then, as shown in FIG. 10l, a multilayer of Ni/Au (Ni is lower layer and Au is upper layer) is formed by sequentially performing electrolyte plating or electroless plating of Ni and Au in this order, or a single layer of Sn is formed by performing electrolyte plating or electroless plating of Sn, to coat the first and second lower conductor films for external electrodes 99a and 99b (third and fourth lower conductor films for external electrodes are also formed but not shown in the figures). Thus, first and second upper conductor films for external electrodes 97a and 97b (third and fourth upper conductor films for external electrodes are also formed but not shown in the figures), each having a L-shaped section and a thickness of about 1.0 to 10 μm are formed. In a desired example, the upper conductor films for external electrodes may be formed from a multilayer of Ni film with a thickness of 3 μm and Au film laminated thereon with a thickness of 0.1 μm.

Then, as shown in FIG. 10m, the rear surface of the substrate 91 is ground to reduce its thickness. For example, in case that the thickness of the substrate 91 before grinding is 1.5 mm, the rear surface of the substrate 91 is ground to have the thickness of about 0.2 to 0.8 mm.

Thereafter, as shown in FIG. 10n, the substrate 91 is completely cut to separate into individual common mode choke coils using a rotational cutting tool for cutting.

As described in detail, according to this embodiment, forming of shallow grooves on the substrate 91 is performed so that side surfaces of each common mode choke coil are exposed before separating it into individual common mode choke coils, then the first to fourth lower conductive films for external electrodes are sputtered on the first to fourth inner electrode layers exposed to the upper surface and on the side surfaces, the first to fourth upper conductive films for external electrodes are plated on the respective first to fourth lower conductive films, and thereafter the substrate 91 is cut to completely separate it into individual common mode choke coils. Since the external electrodes are thus formed before separating the substrate into individual common mode choke coils, it is possible to precisely form the shape, dimensions and position of each external electrode and to more miniaturize the common mode choke coil. Also, since the manufacturing process is not separated into a process for fabricating elements on a substrate and a process performed after the separation of the substrate into individual common mode choke coil chips, the manufacturing cost will not be increased. Further, because each external electrode has a L-shaped section formed by partially coating not only the upper surface of the common mode choke coil but also the side surface of the common mode choke coil, a large area of the electrode can be obtained to provide enough strength in soldering joint for mounting on a printed circuit board. Still further, since the common mode choke coil of this embodiment does not have two ferrite substrates superimposed to face each other as the conventional common mode choke coil, it is possible to have a lower height.

Figure 11A:
FIGS. 11a to 11n show sectional views schematically illustrating manufacturing processes of a common mode choke coil as still further embodiment of an electronic component according to the present invention.
Figure 11B:
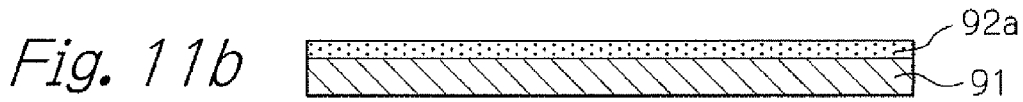
Figure 11C:
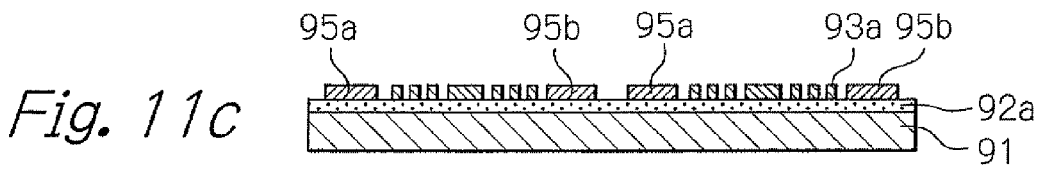
Figure 11D:
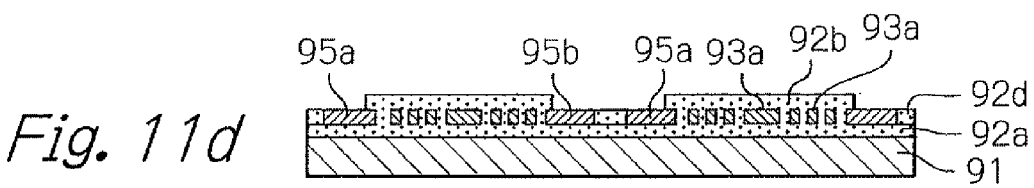
Figure 11E:
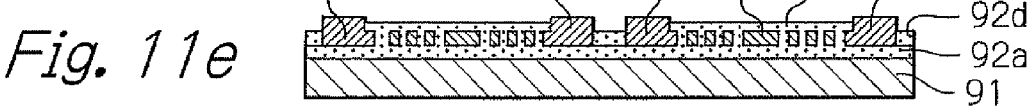
Figure 11F:
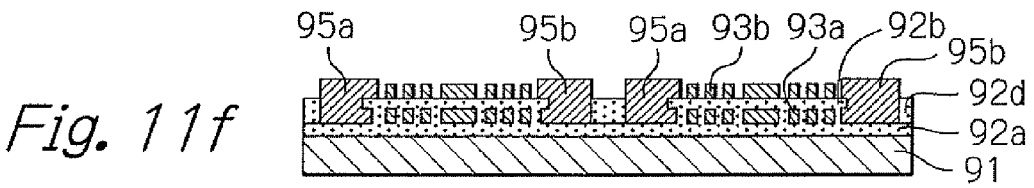
Figure 11G:
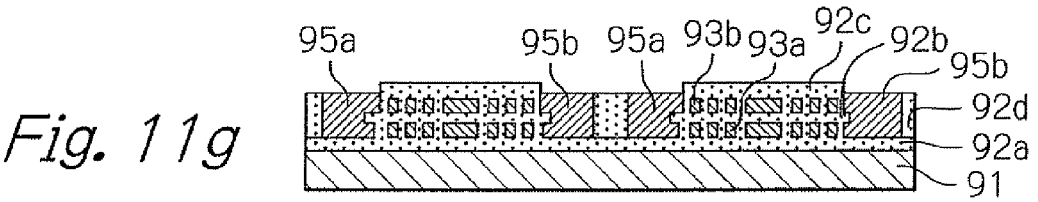
Figure 11H:
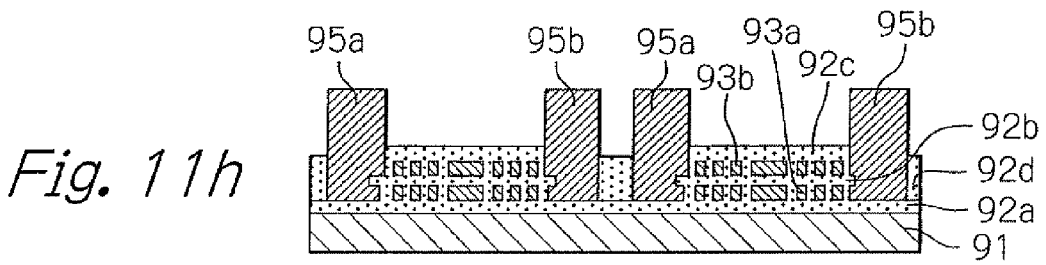
Figure 11I:
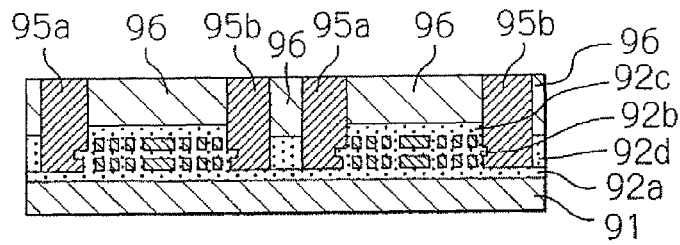
Figure 11J:
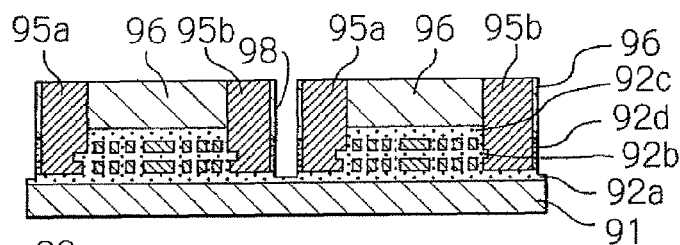
Figure 11K:
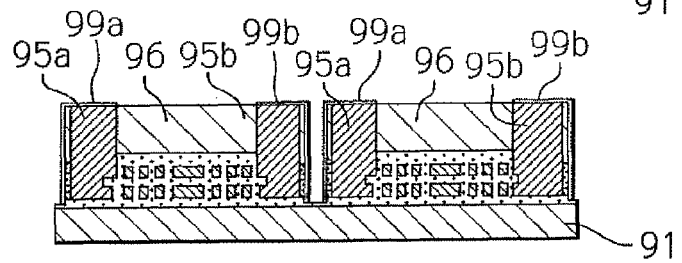
Figure 11L:
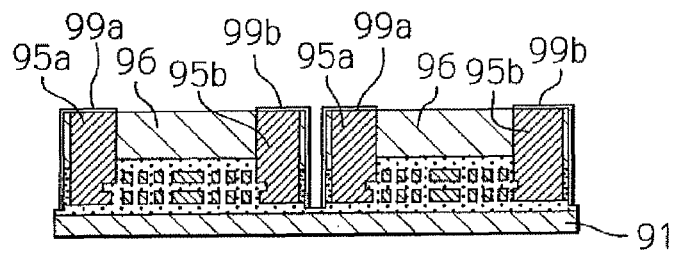
Figure 11M:
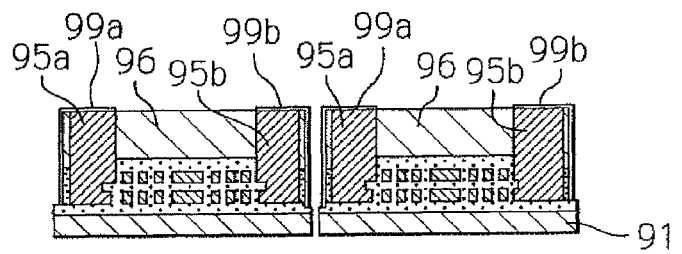
Figure 11N:
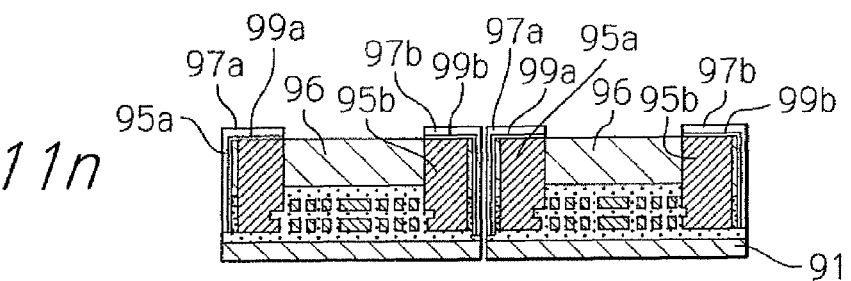

FIGS. 11a to 11n schematically illustrate manufacturing processes of a common mode choke coil as still further embodiment of an electronic component according to the present invention. Note that FIGS. 11a to 11n only show two neighboring common mode choke coils. In the description of this embodiment, components similar to these in the embodiment shown in FIGS. 9a and 9b are indicated by using the same reference numerals. Hereinafter, using these figures, the manufacturing process of the common mode choke coil in this embodiment will be described.

As shown in FIG. 11a, first, a ferrite substrate 91 with a thickness of about 0.1 to 2.0 mm is formed by sintering a ferrite material such as Ni—Zn ferrite, by cutting the sintered ferrite body, by machining the cut ferrite body and by lapping the machined ferrite body.

Then, as shown in FIG. 11b, a first insulation film 92a with a thickness of about 1.0 to 10 μm is formed on the whole surface of the substrate 91 by spin-coating a polyimide resin material over the whole surface of the substrate and by thermally curing the coated polyimide.

Next, as shown in FIG. 11c, a plating seed film (not shown) is formed on the first insulation film 92a by sputtering, and a resist pattern (not shown) is formed thereon. Then, a first coil conductor film 93a and a part of first and second inner electrode layers 95a and 95b (also third and fourth inner electrode layers), having a thickness of about 5.0 to 20 μm, are formed by performing electrolyte plating or electroless plating of a conductive material such as Cu, Au, Al or Ag, and thereafter the resist pattern and the plating seed film under it are removed.

Then, as shown in FIG. 11d, a second insulation film 92b and a fourth insulation film 92d with a thickness of about 3.0 to 20 μm are formed thereon by spin-coating a polyimide resin material thereon, by patterning the coated polyimide resin itself and by thermally curing the polyimide resin pattern.

Next, as shown in FIG. 11e, a plating seed film (not shown) is formed by sputtering, and a resist pattern (not shown) is formed thereon. Then, a lead conductor layer (not shown) and a part of the first and second inner electrode layers 95a and 95b (also third and fourth inner electrode layers), having a thickness of about 5.0 to 20 μm, are formed by performing electrolyte plating or electroless plating of a conductive material such as Cu, Au, Al or Ag, and thereafter the resist pattern and the plating seed film under it are removed.

Then, as shown in FIG. 11f, a plating seed film (not shown) is formed on the second insulation film 92b by sputtering, and a resist pattern (not shown) is formed thereon. Then, a second coil conductor film 93b, having a thickness of about 5.0 to 20 μm, is formed by performing electrolyte plating or electroless plating of a conductive material such as Cu, Au, Al or Ag, and thereafter the resist pattern and the plating seed film under it are removed. It should be noted that the lead conductor layer is extended to the center region of the common mode choke coil 90 and that there is the second insulation film 92b between the lead conductor layer and the second coil conductor film 93b intersected with this lead conductor layer, as shown in FIG. 2.

Next, as shown in FIG. 11g, a third insulation film 92c with a thickness of about 3.0 to 20 μm is formed thereon and a thickness of the fourth insulation film 92d is increased by spin-coating a polyimide resin material thereon, by patterning the coated polyimide resin itself and by thermally curing the polyimide resin pattern.

Then, as shown in FIG. 11h, a resist pattern (not shown) is formed on the third insulation film 92c, the first and second inner electrode layers 95a and 95b (also third and fourth inner electrode layers), having a thickness of about 5.0 to 200 μm, is additionally formed by performing electrolyte plating or electroless plating of a conductive material such as Cu, Au, Al or Ag, and thereafter the resist pattern is removed. It should be noted that until this stage, in other words, until the height of the first and second inner electrode layers 95a and 95b (also third and fourth inner electrode layers) becomes the same as that of the second coil conductor film 93b, these first and second inner electrode layers 95a and 95b (also third and fourth inner electrode layers) will not be exposed to side surfaces 90b and 90c of each common mode choke coil.

Thereafter, as shown in FIG. 11i, a ferrite-resin compound layer 96 with a thickness of about 5.0 to 200 μm is formed thereon by coating an epoxy resin material containing ferrite particles, by thermally curing the epoxy resin, and by polishing the surface of the cured ferrite-resin compound.

Then, as shown in FIG. 11j, shallow grooves 98 are formed on the substrate 91 using a rotational cutting tool for grooving. Each shallow groove 98 is formed between the common mode choke coils coupled to each other to have a width of for example about 70 μm without completely separating the substrate 91 into the individual common mode choke coils. By forming the shallow groove 98 on the substrate 91, the side surfaces 90b and 90c of each common mode choke coil 90 is exposed. Also, because the shallow groove 98 is formed at the position of the ferrite-resin compound layer 96 and the fourth insulation layer 92d, a part of the ferrite-resin compound layer 96 and the fourth insulation layer 92d is exposed to the side surfaces 90b and 90c. It should be noted that the first and second inner electrode layers 95a and 95b (also third and fourth inner electrode layers) are not exposed to the side surfaces 90b and 90c of each common mode choke coil but a part of them is exposed to only the upper surface 90a. Since the shallow groove machining is performed at the position of the insulation material of such as polyimide resin and epoxy resin, no clogging of the rotational cutting tool for grooving will occur and also an enough margin for grooving will be ensured.

Next, as shown in FIG. 11k, the first and second lower conductor films for external electrodes 99a and 99b are formed by sputtering to coat the first and second inner electrode layers 95a and 95b at the upper surface 90a of the common mode choke coil 90 and to coat a part of the side surface of the fourth insulation layer 92d at the side surfaces 90b and 90c of the common mode choke coil 90. More concretely, a mask (not shown) having a rectangular shaped opening that extends over the neighboring two inner electrodes (95a to 95d) exposed to the upper surfaces of the two common mode choke coils 90 faced to each other through the shallow groove 98 is formed on the upper surfaces of the common mode choke coils 90. Then, a multilayer of Cu/Cr (Cu is lower layer and Cr is upper layer) or Cu/Ti (Cu is lower layer and Ti is upper layer) is deposited on the upper surfaces of the two inner electrodes (95a to 95d), on the upper ends of the epoxy resin side layers containing ferrite particles and on the both side surfaces of the inner electrodes exposed to the shallow graves 98, by sputtering directed perpendicular to the upper surface to form the first and second lower conductor films for external electrodes 99a and 99b (third and fourth lower conductor films for external electrodes are also formed but not shown in the figures) with a L-shaped section and a thickness of about 100 to 10,000 nm. If a three-dimensional mask for covering a part of the side surfaces of the inner electrodes exposed to the shallow graves 98 is used, it is possible to form first and second lower conductor films for external electrodes 99a and 99b with a precise shape.

Then, as shown in FIG. 11l, the rear surface of the substrate 91 is ground to reduce its thickness. For example, in case that the thickness of the substrate 91 before grinding is 1.5 mm, the rear surface of the substrate 91 is ground to have the thickness of about 0.2 to 0.8 mm.

Then, as shown in FIG. 11m, the substrate 91 is cut to completely separate the substrate 91 into individual common mode choke coils using a rotational cutting tool for cutting.

Next, as shown in FIG. 11n, the external electrodes are formed by barrel-plating on the separated individual common mode choke coils. Namely, by this barrel-plating, a multilayer of Ni/Au (Ni is lower layer and Au is upper layer) is formed by sequentially performing electrolyte plating or electroless plating of Ni and Au in this order, or a single layer of Sn is formed by performing electrolyte plating or electroless plating of Sn, to coat the first and second lower conductor films for external electrodes 99a and 99b (third and fourth lower conductor films for external electrodes are also formed but not shown in the figures). Thus, first and second upper conductor films for external electrodes 97a and 97b (third and fourth upper conductor films for external electrodes are also formed but not shown in the figures), each having a L-shaped section and a thickness of about 1.0 to 10 μm are formed. In a desired example, the upper conductor films for external electrodes may be formed from a multilayer of Ni film with a thickness of 3 μm and Au film laminated thereon with a thickness of 0.1 μm.

As described in detail, according to this embodiment, forming of shallow grooves on the substrate 91 is performed so that side surfaces of each common mode choke coil are exposed before separating it into individual common mode choke coils, then the first to fourth lower conductive films for external electrodes are sputtered on the first to fourth inner electrode layers exposed to the upper surface and on the side surfaces, the substrate 91 is cut to completely separate it into individual common mode choke coils, and thereafter the first to fourth upper conductive films for external electrodes are formed by barrel-plating on the respective first to fourth lower conductive films. Since the external electrodes are thus formed by barrel-plating on the first to fourth lower conductor films for external electrodes, it is possible to precisely form the shape, dimensions and position of each external electrode and to more miniaturize the common mode choke coil. Also, because each external electrode has a L-shaped section formed by partially coating not only the upper surface of the common mode choke coil but also the side surface of the common mode choke coil, a large area of the electrode can be obtained to provide enough strength in soldering joint for mounting on a printed circuit board. Still further, since the common mode choke coil of this embodiment does not have two ferrite substrates superimposed to face each other as the conventional common mode choke coil, it is possible to have a lower height.

FIGS. 12a to 12m schematically illustrate manufacturing processes of a common mode choke coil as further embodiment of an electronic component according to the present invention. Note that FIGS. 12a to 12m only show two neighboring common mode choke coils. Hereinafter, using these figures, the manufacturing process of the common mode choke coil in this embodiment will be described.

Figure 12A:

As shown in FIG. 12a, first, a ferrite substrate 121 with a thickness of about 0.1 to 2.0 mm is formed by sintering a ferrite material such as Ni—Zn ferrite, by cutting the sintered ferrite body, by machining the cut ferrite body and by lapping the machined ferrite body.

Figure 12B:
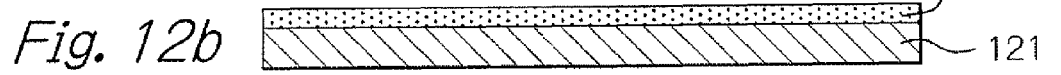

Then, as shown in FIG. 12b, a first insulation film 122a with a thickness of about 1.0 to 10 μm is formed on the whole surface of the substrate 121 by spin-coating a polyimide resin material over the whole surface of the substrate and by thermally curing the coated polyimide.

Figure 12C:
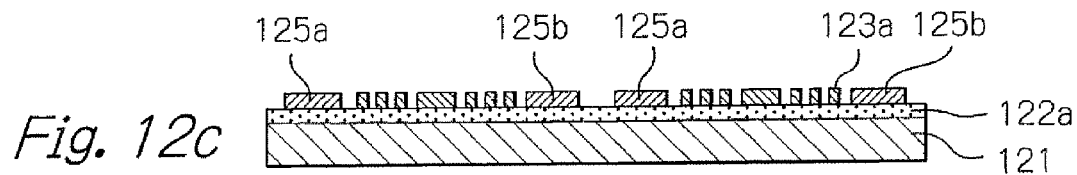

Next, as shown in FIG. 12c, a plating seed film (not shown) is formed on the first insulation film 122a by sputtering, and a resist pattern (not shown) is formed thereon. Then, a first coil conductor film 123a and a part of first and second inner electrode layers 125a and 125b (also third and fourth inner electrode layers), having a thickness of about 5.0 to 20 μm, are formed by performing electrolyte plating or electroless plating of a conductive material such as Cu, Au, Al or Ag, and thereafter the resist pattern and the plating seed film under it are removed.

Figure 12D:
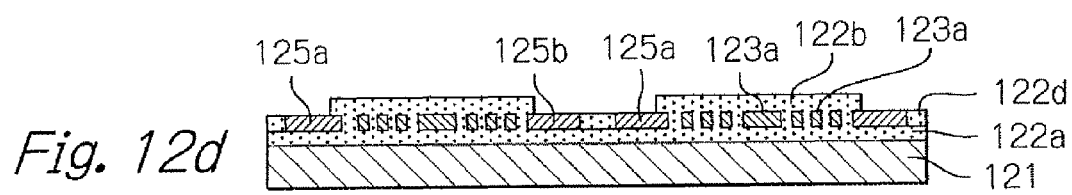

Then, as shown in FIG. 12d, a second insulation film 122b and a fourth insulation film 122d with a thickness of about 3.0 to 20 μm are formed thereon by spin-coating a polyimide resin material thereon, by patterning the coated polyimide resin itself and by thermally curing the polyimide resin pattern.

Figure 12E:
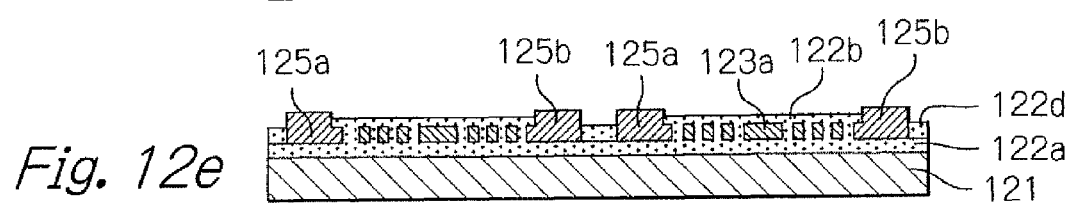

Next, as shown in FIG. 12e, a plating seed film (not shown) is formed by sputtering, and a resist pattern (not shown) is formed thereon. Then, a lead conductor layer (not shown) and a part of the first and second inner electrode layers 125a and 125b (also third and fourth inner electrode layers), having a thickness of about 5.0 to 20 μm, are formed by performing electrolyte plating or electroless plating of a conductive material such as Cu, Au, Al or Ag, and thereafter the resist pattern and the plating seed film under it are removed.

Figure 12F:
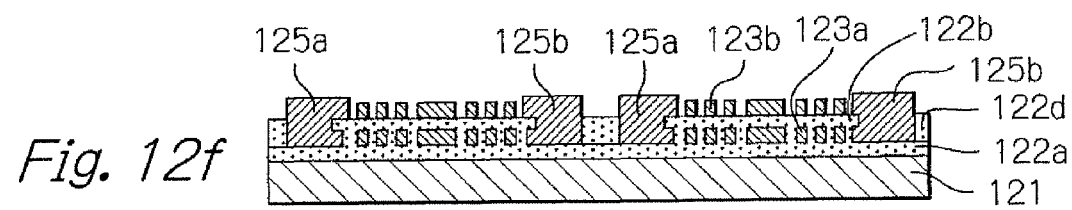

Then, as shown in FIG. 12f, a plating seed film (not shown) is formed on the second insulation film 122b by sputtering, and a resist pattern (not shown) is formed thereon. Then, a second coil conductor film 123b, having a thickness of about 5.0 to 20 μm, is formed by performing electrolyte plating or electroless plating of a conductive material such as Cu, Au, Al or Ag, and thereafter the resist pattern and the plating seed film under it are removed. It should be noted that the lead conductor layer is extended to the center region of the common mode choke coil and that there is the second insulation film 122*b* between the lead conductor layer and the second coil conductor film 123*b* intersected with this lead conductor layer, as shown in FIG. 2.

Figure 12G:
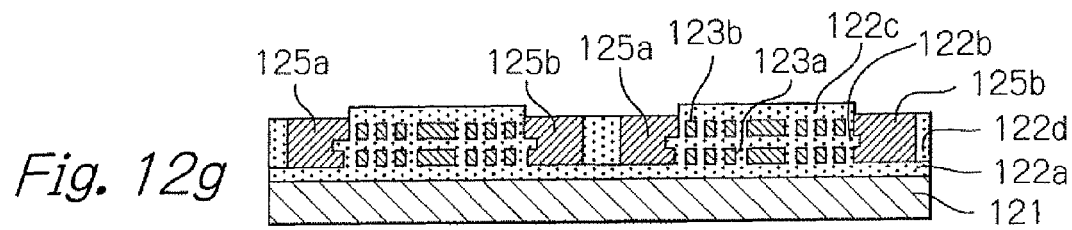

Next, as shown in FIG. 12*g*, a third insulation film 122*c* with a thickness of about 3.0 to 20 μm is formed thereon and a thickness of the fourth insulation film 122*d* is increased by spin-coating a polyimide resin material thereon, by patterning the coated polyimide resin itself and by thermally curing the polyimide resin pattern.

Figure 12H:
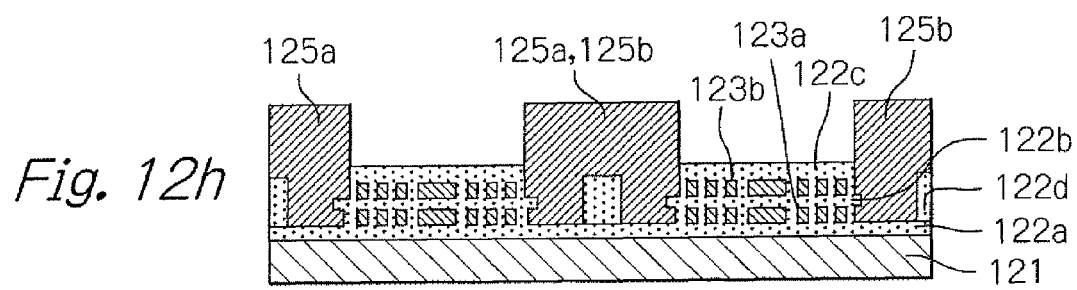

Then, as shown in FIG. 12*h*, a resist pattern (not shown) is formed on the third insulation film 122*c*, the first and second inner electrode layers 125*a* and 125*b* (also third and fourth inner electrode layers), having a thickness of about 5.0 to 200 μm, is additionally formed by performing electrolyte plating or electroless plating of a conductive material such as Cu, Au, Al or Ag, and thereafter the resist pattern is removed. It should be noted that until this stage, in other words, until the height of the first and second inner electrode layers 125*a* and 125*b* (also third and fourth inner electrode layers) becomes the same as that of the second coil conductor film 123*b*, these first and second inner electrode layers 125*a* and 125*b* (also third and fourth inner electrode layers) will not be exposed to side surfaces of each common mode choke coil.

Thereafter, as shown in FIG. 12*i*, a ferrite-resin compound layer 126 with a thickness of about 5.0 to 200 μm is formed thereon by coating an epoxy resin material containing ferrite particles, by thermally curing the epoxy resin, and by polishing the surface of the cured ferrite-resin compound.

Then, as shown in FIG. 12*j*, shallow grooves 128 are formed on the substrate 121 using a rotational cutting tool for grooving. Each shallow groove 128 is formed between the common mode choke coils coupled to each other to have a width of for example about 70 μm without completely separating the substrate 121 into the individual common mode choke coils. By forming the shallow groove 128 on the substrate 121, the side surfaces of each common mode choke coil is exposed. Also, because the shallow groove 128 is formed at the position of the ferrite-resin compound layer 126 and the fourth insulation layer 122*d*, a part of the ferrite-resin compound layer 126 and the fourth insulation layer 122*d* is exposed to the side surfaces. It should be noted that lower parts of the first and second inner electrode layers 125*a* and 125*b* (also third and fourth inner electrode layers) are not exposed to the side surfaces of each common mode choke coil, but upper parts of them are exposed to the side surfaces of each common mode choke coil and parts of them are exposed to the upper surface. Since the shallow groove machining is performed at the position of the insulation material of such as polyimide resin and epoxy resin, no clogging of the rotational cutting tool for grooving will occur and also an enough margin for grooving will be ensured.

Next, as shown in FIG. 12*k*, a multilayer of Ni/Au (Ni is lower layer and Au is upper layer) is formed by sequentially performing electrolyte plating or electroless plating of Ni and Au in this order, or a single layer of Sn is formed by performing electrolyte plating or electroless plating of Sn, to coat the first and second inner electrode layers 125*a* and 125*b* (also third and fourth inner electrode layers) exposed on the upper surface and the side surfaces of the common mode choke coil. Thus, the first and second external electrode films 127*a* and 127*b* (also third and fourth external electrode films), each having a L-shaped section and a thickness of about 1.0 to 10 μm are formed. In a desired example, the external electrodes may be formed from a multilayer of Ni film with a thickness of 3 μm and Au film laminated thereon with a thickness of 0.1 μm.

Then, as shown in FIG. 12*l*, the rear surface of the substrate 121 is ground to reduce its thickness. For example, in case that the thickness of the substrate 121 before grinding is 1.5 mm, the rear surface of the substrate 21 is ground to have the thickness of about 0.2 to 0.8 mm.

Thereafter, as shown in FIG. 12*m*, the substrate 121 is completely cut to separate into individual common mode choke coils using a rotational cutting tool for cutting.

As described in detail, according to this embodiment, forming of shallow grooves on the substrate 121 is performed so that side surfaces of each common mode choke coil are exposed before separating it into individual common mode choke coils, then the first to fourth external electrode films 127*a* to 127*d* are plated on the respective first to fourth inner electrode layers 125*a* to 125*d* exposed on the side surfaces and upper surface, and thereafter the substrate 121 is completely cut to separate into individual common mode choke coils. Since the external electrodes are thus formed before separating the substrate into individual common mode choke coils, it is possible to precisely form the shape, dimensions and position of each external electrode and to more miniaturize the common mode choke coil. Also, since the manufacturing process is not separated into a process for fabricating elements on a substrate and a process performed after the separation of the substrate into individual common mode choke coil chips, the manufacturing cost will not be increased. Further, because each external electrode has a L-shaped section formed by partially coating not only the upper surface of the common mode choke coil but also the side surface of the common mode choke coil, a large area of the electrode can be obtained to provide enough strength in soldering joint for mounting on a printed circuit board. Still further, since the common mode choke coil of this embodiment does not have two ferrite substrates superimposed to face each other as the conventional common mode choke coil, it is possible to have a lower height.

In the aforementioned embodiments, an electronic component is configured by a common mode choke coil with four external electrodes. However, an electronic component according to the present invention is not limited to such common mode choke coil but is applicable to for example an electronic component having at least one inductor, capacitor, resister or other passive element. Also, the number of the external electrodes of the electronic component is not limited to four but any number other than four may be adapted. Further, the present invention is applicable to an electronic component having a plurality of passive elements in a single package.

Many widely different embodiments of the present invention may be constructed without departing from the spirit and scope of the present invention. It should be understood that the present invention is not limited to the specific embodiments described in the specification, except as defined in the appended claims.

The invention claimed is:

1. An electronic component comprising:
a substrate;
at least one passive element formed on a top surface of the substrate;
an insulation layer that is formed on the top surface of the substrate and covers said at least one passive element;
a plurality of conductor layers electrically connected to said at least one passive element and formed on a part of the insulation layer on an outer side of said insulation layer, such that the part of the insulation layer on the outer side of the insulation layer is between the plurality of conductor layers and the substrate, the plurality of conductor layers extending to at least a part of an upper surface of said electronic component;

a plurality of external electrodes, each being formed in a L-shaped section, the L-shaped section having a first part formed to coat said plurality of conductor layers at the part of the upper surface of said electronic component, and a second part formed to coat at least one side surface of said electronic component, the second part extending from the upper surface of the electronic component along the at least one side surface downward towards the part of the insulation layer on the outer side of the insulation layer without reaching the substrate; and a magnetic-material contained layer filled between said plurality of conductor layers.

2. The electronic component as claimed in claim 1, wherein each of said plurality of external electrodes is formed in the L-shaped section only between the upper surface and a one side surface of said electronic component.

3. The electronic component as claimed in claim 1, wherein each of said plurality of external electrodes is formed in the L-shaped section between the upper surface and each of two side surfaces of said electronic component and between the two side surfaces of said electronic component.

4. The electronic component as claimed in claim 1, wherein said plurality of conductor layers are extended to the part of the upper surface of said electronic component and to the part of the at least one side surface of said electronic component, and wherein said plurality of external electrodes are coated on said plurality of conductor layers at the part of the upper surface of said electronic component and on the part of the at least one side surface of said electronic component.

5. The electronic component as claimed in claim 1, wherein each of said plurality of external electrodes consists of a conductor film plated on each of said plurality of conductor layers.

6. The electronic component as claimed in claim 5, wherein each of said conductor films is composed of a multi-layered film including a gold film or of a tin film.

7. The electronic component as claimed in claim 1, wherein said plurality of conductor layers are extended only to the part of the upper surface of said electronic component, and wherein said plurality of external electrodes are electrically conducted to said plurality of conductor layers only at the part of the upper surface of said electronic component.

8. The electronic component as claimed in claim 1, wherein each of said plurality of external electrodes consists of a lower conductor film formed on each of said plurality of conductor layers at the part of the upper surface of said electronic component and formed on the part of the at least one side surface of said electronic component, and an upper conductor film plated on said lower conductor film.

9. The electronic component as claimed in claim 8, wherein said lower conductor film is composed of a multi-layered film including a cupper film.

10. The electronic component as claimed in claim 8, wherein said upper conductor film is composed of a multi-layered film including a gold film or of a tin film.

11. The electronic component as claimed in claim 1, wherein said at least one passive element comprises at least one of an inductor, a capacitor and a resister.

12. The electronic component as claimed in claim 11, wherein said electronic component comprises a common mode choke coil with said inductor, another insulation layer containing a magnetic material, and a magnetic substrate on which said inductor is mounted.

* * * * *